United States Patent
Yuasa et al.

(10) Patent No.: US 6,428,440 B2
(45) Date of Patent: Aug. 6, 2002

(54) APPARATUS AND A METHOD FOR CONTROLLING AN AUTOMATIC TRANSMISSION

(75) Inventors: Hiroyuki Yuasa; Yoshikazu Tanaka, both of Atsugi (JP)

(73) Assignee: Unisia Jecs Corporation, Kanagawa-ken (JP)

( * ) Notice: Subject to any disclaimer, the term of this patent is extended or adjusted under 35 U.S.C. 154(b) by 0 days.

(21) Appl. No.: 09/778,907

(22) Filed: Feb. 8, 2001

(30) Foreign Application Priority Data

Feb. 9, 2000 (JP) ........................................ 2000-032401

(51) Int. Cl.[7] ............................................. F16H 31/00
(52) U.S. Cl. ........................................ 475/125; 475/128
(58) Field of Search .................................. 475/128, 125, 475/118, 120; 74/335, 336 R

(56) References Cited

U.S. PATENT DOCUMENTS

| | | | | |
|---|---|---|---|---|
| 5,123,302 A | * | 6/1992 | Brown et al. | 74/866 |
| 5,865,708 A | * | 2/1999 | Nishio et al. | 477/155 |
| 6,128,565 A | * | 10/2000 | Tsutsui et al. | 701/51 |
| 6,267,708 B1 | * | 7/2001 | Sato et al. | 477/120 |

FOREIGN PATENT DOCUMENTS

JP          09133205          5/1997

* cited by examiner

*Primary Examiner*—Dirk Wright
(74) *Attorney, Agent, or Firm*—Sughrue Mion, PLLC

(57) ABSTRACT

In an automatic transmission for conducting a gear change by replacing friction engagement elements, a transmission torque capacity of an engage side friction engagement element at a torque phase is corrected based upon a change amount per unit time of a turbine rotation speed at the torque phase or a torque phase time.

20 Claims, 27 Drawing Sheets

FIG.2

|   | L/C | L&R/B | 2&4/B | H/C | R/C | L/OWC |
|---|-----|-------|-------|-----|-----|-------|
| 1 | ○ | ● |   |   |   | △ |
| 2 | ○ |   | ○ |   |   |   |
| 3 | ○ |   |   | ○ |   |   |
| 4 |   |   | ○ | ○ |   |   |
| R |   | ○ |   |   | ○ |   |

○ ENGAGE
● ENGAGE AT FIRST RANGE
△ ENGAGE AT DRIVING RANGE

APPARATUS AND A METHOD FOR CONTROLLING AN AUTOMATIC TRANSMISSION

FIELD OF THE INVENTION

The present invention relates to an apparatus for and a method of controlling an automatic transmission, especially an automatic transmission constituted to carry out a gear change by replacing friction engagement elements.

RELATED ART OF THE INVENTION

There has been known a conventional automatic transmission constituted to control the engagement and release of friction engagement elements by the oil pressure and to carry out a gear change by making friction engagement element replacement in which an engaging control and a releasing control of two different friction engagement elements are conducted at the same time (refer to Japanese Unexamined Patent Publication 9-133205).

When a gear change is carried out by replacing friction engagement elements, as described above, if a releasing control is made too earlier than an engaging control, it generates a racing of engine rotation. On the contrary, if the releasing control is made more slowly than the engaging control, it generates a drive torque drag. Therefore, the friction engagement elements must be replaced while restricting the racing of engine rotation or the generation of drive torque drag.

Accordingly, there has been conducted a control wherein an input shaft torque of a speed change mechanism is estimated, and the sharing burden of the torque transmission is gradually transferred from a release side friction engagement element to an engage side friction engagement element, while the torque capacity capable of transmitting the input shaft torque being shared by the release side friction engagement element and the engage side friction engagement element.

However, due to variations in friction engagement elements and aging thereof, as well as, an estimation error of the input shaft torque, an optimal control of a transmission torque capacity cannot be performed. As a result, there have been cases in that the racing of engine rotation and a torque drag may become large.

SUMMARY OF THE INVENTION

The present invention has been achieved in view of the forgoing problems, and has an object of providing an apparatus for and a method of controlling an automatic transmission capable of restricting a racing of engine rotation and a drive torque drag, regardless of variations in friction engagement elements, aging thereof or an estimation error of input shaft torque.

In order to achieve the above object, the present invention is constituted so that at least one of a transmission torque capacity of an engage side friction engagement element and a transmission torque capacity of a release side friction engagement element at a torque phase is corrected based upon the torque phase state.

According to this constitution, a racing of engine rotation or a drive torque drag is detected based upon the torque phase state and at least one of the transmission torque capacity at the engage side and the transmission torque capacity at the release side is corrected so that the racing of engine rotation or the drive torque drag is restricted.

Here, the constitution may be such that the torque phase time may be detected as the torque phase state.

The torque phase time is the time elapsed from a start of replacing friction engagement torque until completion thereof. As the torque phase time is longer, the racing of engine rotation or the drive torque drag is judged to be greater.

Further, the constitution may be such that, as the torque phase state, a change quantity of input shaft rotation speed of the transmission at the torque phase is detected and also a peak value or an integration value of the change quantity is detected.

According to this constitution, as the change quantity of input shaft rotation speed becomes greater, the racing of engine rotation or the drive torque drag is judged to be greater.

The change quantity of input shaft rotation speed may be calculated as a deviation between a reference input shaft rotation speed calculated based upon a gear ratio prior to gear change and an output shaft rotation speed of transmission, and the aforesaid input shaft rotation speed.

According to this constitution, the input shaft rotation speed corresponding to the gear ratio prior to gear change is obtained as the reference input shaft rotation speed, based upon the gear ratio prior to gear change and the output shaft rotation speed of a speed change mechanism. A deviation of an actual input shaft rotation speed to the reference input shaft rotation speed is calculated as a change quantity of the input shaft rotation speed at the torque phase.

Further, more specifically, the constitution may be such that the transmission capacity of friction engagement element is determined based upon an input shaft torque of the speed change mechanism, a critical torque ratio and a tolerance range that is changed corresponding to a time elapse. A change characteristic of the tolerance range may be changed corresponding to the torque phase state.

According to this constitution, a minimum transmission torque capacity (a critical transmission torque capacity) at that time is obtained based on the input shaft torque and the critical torque ratio and a tolerance range component to the critical transmission torque capacity is set by the tolerance range. By changing the tolerance range with time, the engage side transmission torque capacity is gradually increased from a value smaller than the critical transmission torque capacity while the release side transmission torque capacity is gradually reduced from a value greater than the critical transmission torque capacity, so as to change the torque from the release side to the engage side.

By off-setting the tolerance range corresponding to the torque phase state, the transmission torque capacity of the friction engagement element may be changed and further, a correction of transmission torque capacity with the change of tolerance range may be limited to the engage side friction engagement element.

The other objects and features of the present invention will become understood from the following description with reference to the accompanying drawings.

BRIEF EXPLANATION OF THE DIAGRAMS

FIG. 2 is a diagram showing a relationship between combinations of engagement states of friction engagement elements in the speed change mechanism and speed change Step S;

PREFERRED EMBODIMENT

Figure 1:
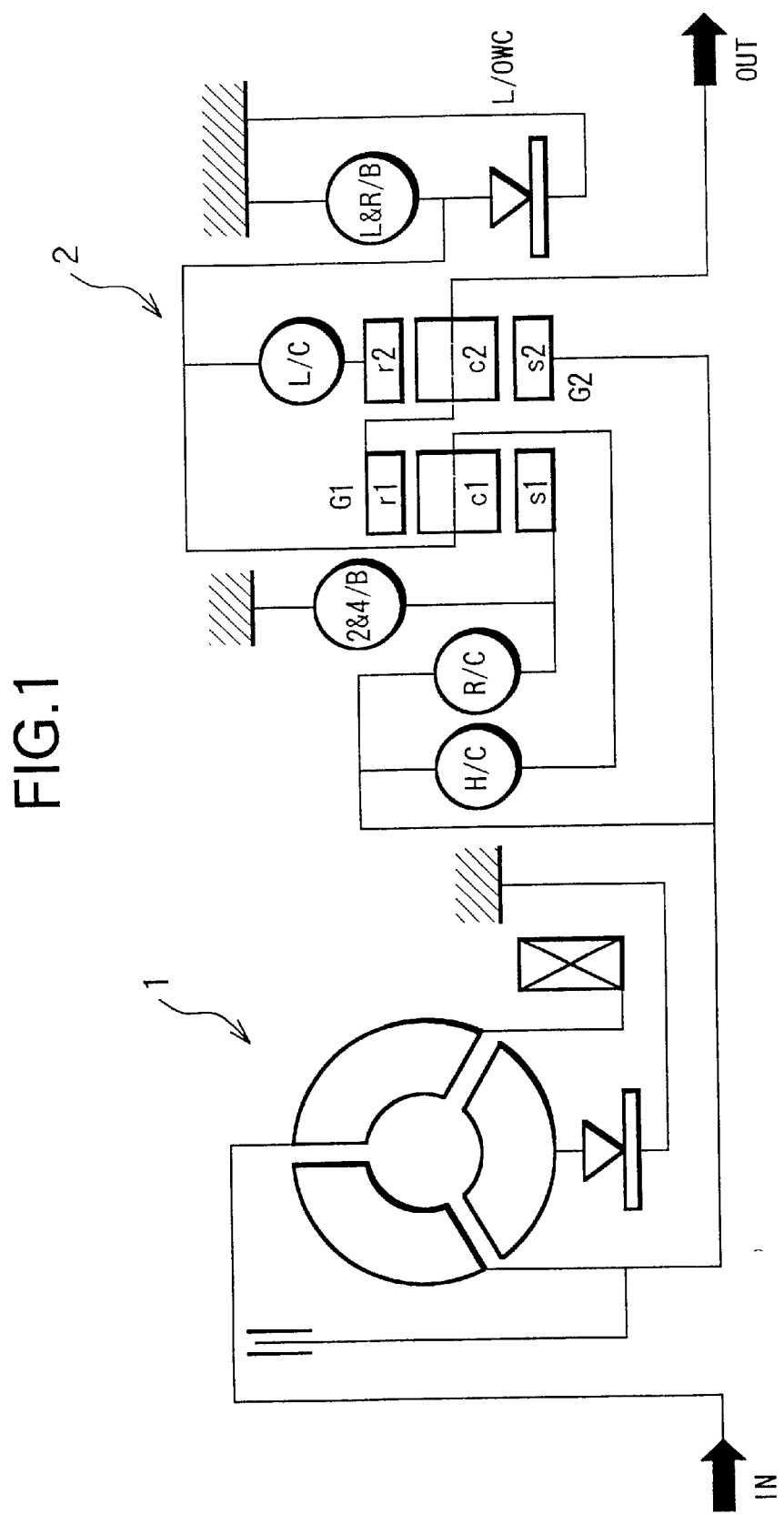
FIG. 1 is a diagram showing a speed change mechanism of an automatic transmission in an embodiment.

FIG. 1 shows a speed change mechanism of an automatic transmission in one embodiment, wherein an engine output is transmitted via a torque converter 1 to a speed change mechanism 2.

The speed change mechanism 2 includes two sets of planetary gears G1, G2, three sets of multi plate clutches H/C, R/C, L/C, a set of brake bands 2 & 4/B, a set of multi plate brakes L & R/B and a set of one way clutches L/OWC.

Each of the two sets of planetary gears G1, G is a simple planetary gear having sun gears S1, S2, ring gears r1, r2, and carriers c1, c2.

The sun gear S2 of the planetary gear set G1 is constituted to be connectable to an input shaft IN by the reverse clutch R/C and to be fixed by the brake band 2 & 4/B.

The sun gear S2 of the planetary gear set G2 is connected to the input shaft IN directly.

The carrier c1 of the planetary gear set G1 is constituted to be connectable to the input shaft IN by the high clutch H/C, the ring gear r2 of the planetary gear set G2 is constituted to be connectable to the carrier c1 of the planetary gear set G1 by the low clutch L/C, and the carrier c1 of the planetary gear set G1 can be fixed by the low and reverse brake L & R/B.

The ring gear r1 of the planetary gear set G1 and the carrier c2 of the planetary gear set G2 are integrally connected to an output shaft OUT.

In the speed change mechanism 2 having the above constitution, first speed—fourth speed and reversal are realized by combinations of engagement states of the respective clutches and brakes.

In FIG. 2, a circle mark shows an engagement state and a portion with no mark shows a release state. In particular, the engagement state of the Low & R/B in the first speed as shown by a black circle mark shows an engagement at only a first range.

According to the engagement state combinations of respective clutches and brakes shown in FIG. 2, at the time of downshift from the fourth speed to the third speed, the brake band 2 & 4/B is released and also the low clutch L/C is engaged. At the time of downshift from the third speed to the second speed, the high clutch H/C is released and also the brake band 2 & 4/B is engaged. At the time of upshift from the second speed to the third speed, the brake band 2 & 4/B is released and also the high clutch H/C is engaged. At the time of upshift from the third speed to the fourth speed, the low clutch L/C is released and also the brake band 2 & 4/B is engaged. As above, such a gear change to replace friction engagement elements by simultaneously controlling the engagement and release of clutches and brakes (friction engagement elements) is called "a replacing gear change".

Figure 3:
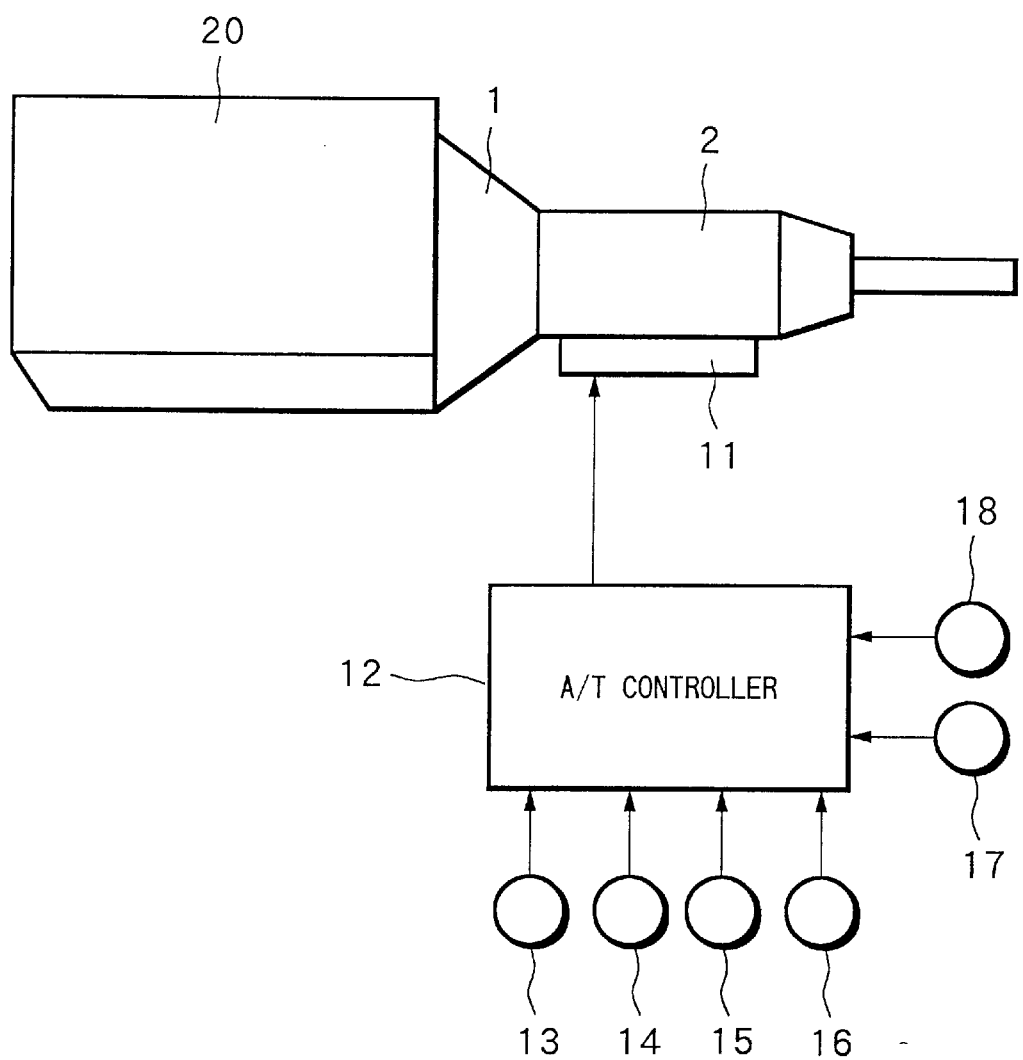
FIG. 3 is a system diagram showing a control system in the automatic transmission.

Each of the aforesaid respective clutches and brakes (friction engagement elements) operates by an appropriate supply oil pressure, and the supply oil pressure to each clutch and brake is adjusted by various kinds of solenoid valves disposed in a solenoid valve unit 11 shown in FIG. 3.

An A/T controller 12 for controlling the various kinds of solenoid valves in the solenoid valve unit 11 receives detection signals from an A/T oil temperature sensor 13, an accelerator opening degree sensor 14, a vehicle speed sensor 15, a turbine rotation sensor 16, an engine rotation sensor 17, an air flow meter 18 and the like, and based upon the detection results of these sensors, an engage oil pressure in each friction engagement element is controlled.

In FIG. 3, the numeral 20 shows an engine equipped with the above automatic transmission. A state of the replacing gear change by the A/T controller 12 will be explained, as an example, for the case of upshift (hereinafter, to be referred as power-on upshift) under a situation where a drive torque of engine is applied.

Figure 4:
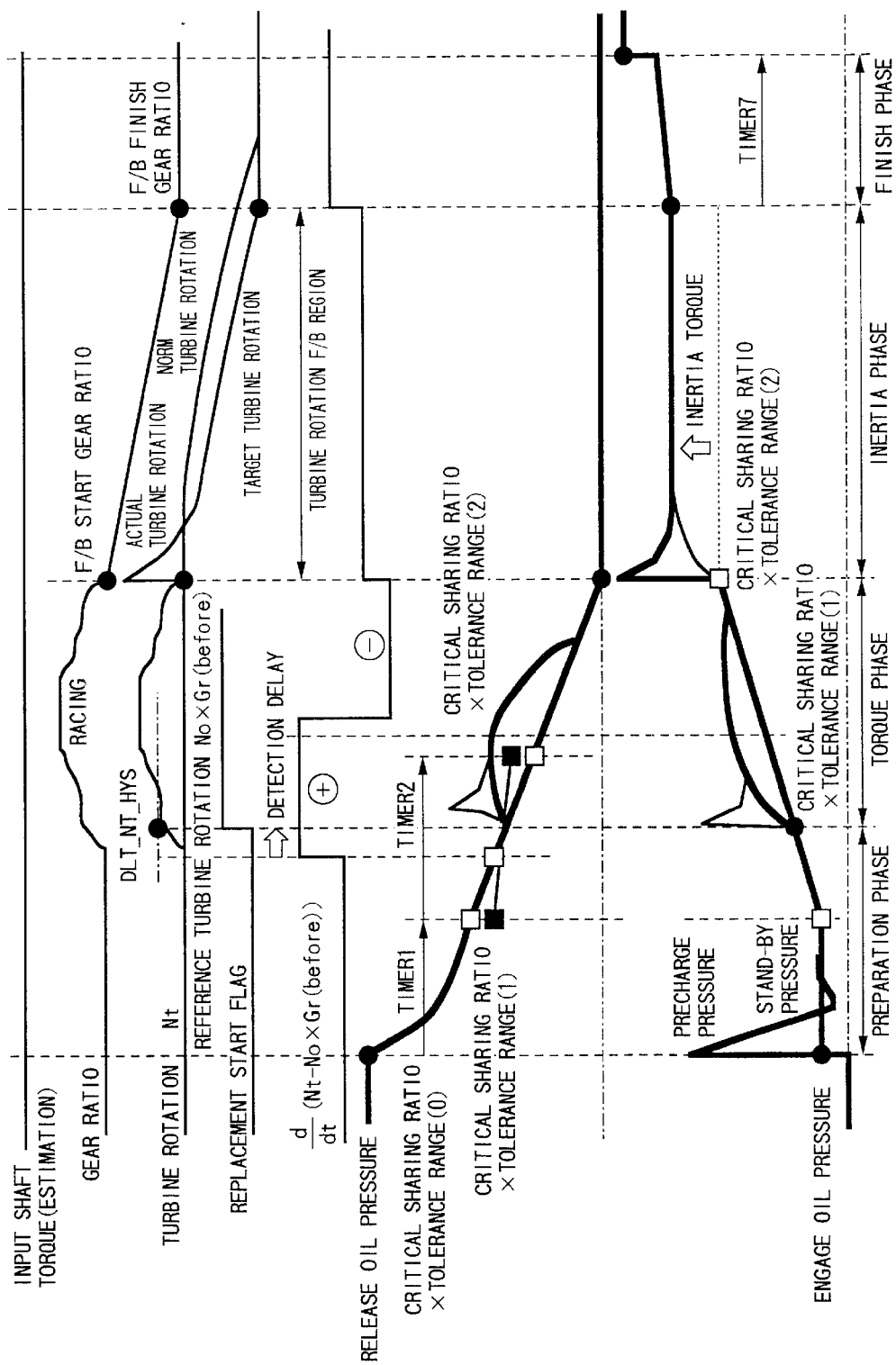
FIG. 4 is a time chart showing a gear change state by a replacement of friction engagement elements in the embodiment.

An outline of the control will be explained according to a block diagram in FIG. 5 with reference to a time chart in FIG. 4, followed by a detailed description.

At an input shaft torque estimation unit 101, an input shaft torque of the speed change mechanism is estimated, and at a release side F/F control unit 102 and at an engage side F/F control unit 103, feedforward amounts F/F of transmission torque capacity in a release side friction engagement element and an engage side friction engagement elements is calculated based upon the input shaft torque. Here, the transmission torque capacity of the release side friction engagement element is reduced gradually while the transmission torque capacity of the engage side friction engagement element is increased so that the engage side friction engagement element can share the torque in an amount over the torque the release side friction engagement element can bear.

When it is detected at a torque phase judgment unit 104 that the status has reached a torque phase, a correction torque capacity is set to restrict occurrence of racing due to a lack of torque capacity at a control unit for realizing function of one-way-clutch in software 105 (to be referred as OWC control hereinunder). This correction torque capacity is added to a feedforward amount F/F of the release side friction engagement element (and the engage side friction engagement element).

When it is detected at an inertia phase judgment 106 that the status has reached an inertia phase, a feedback correction amount is set at a rotation FIB control unit 107 to make a turbine rotation speed (an input shaft rotation speed) be in accordance with a target speed and this feedback correction amount is added to a feedforward amount F/F of the engage side friction engagement element.

Thus, when the transmission torque capacity in each of the release side friction engagement element and the engage friction engagement elements is determined, at a torque oil pressure conversion unit 108, the transmission torque capacity is converted to an oil pressure. This oil pressure is filtered by a reverse filter 109 to perform a dynamic characteristic compensation. The filtered oil pressure is converted to a control duty of the solenoid valve at an oil pressure-duty conversion unit 110 and the power supply to each solenoid valve is controlled by the control duty.

Figure 6:
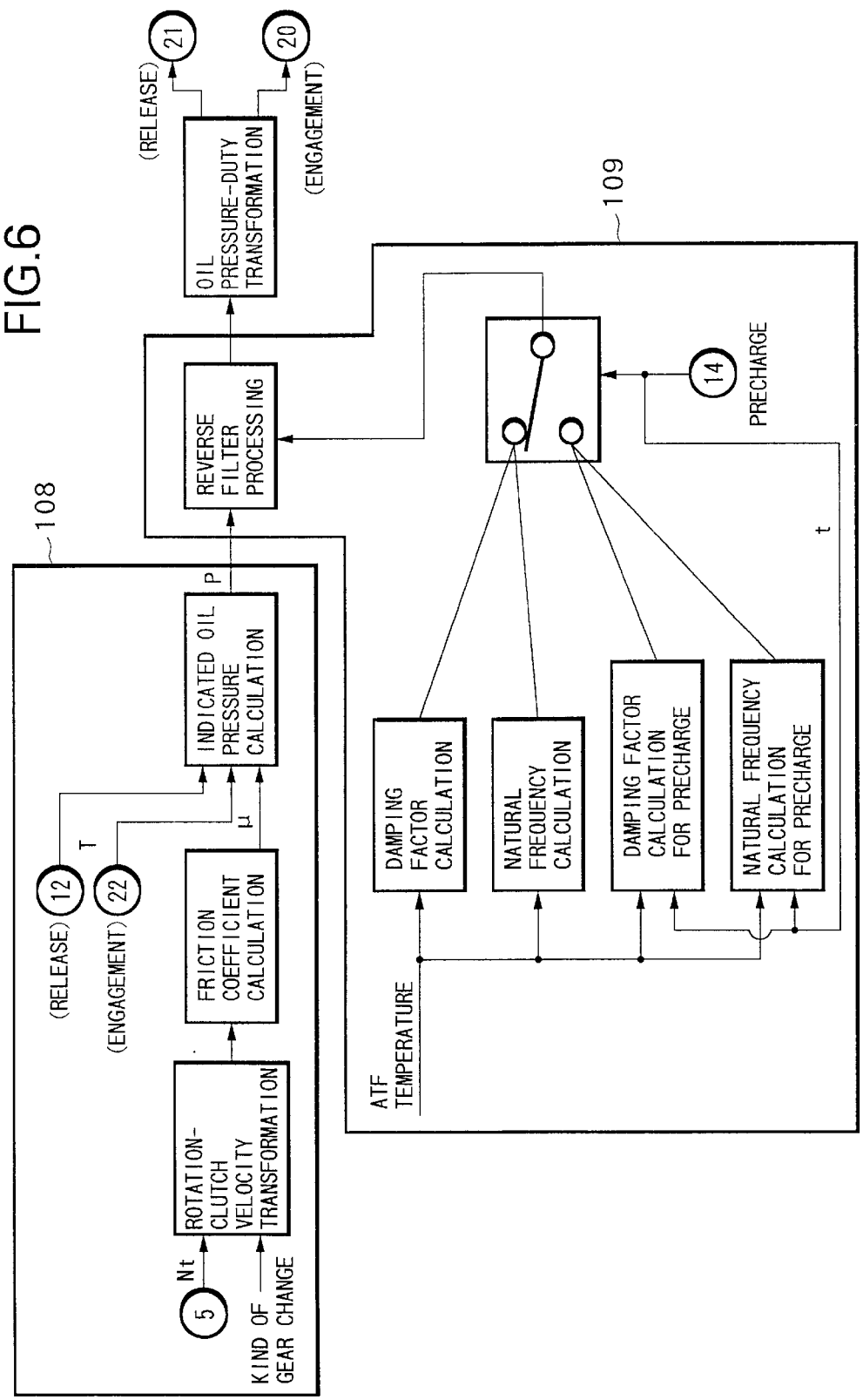
FIG. 6 is a control block diagram showing a block determining an indicated oil pressure based upon a demand torque capacity.

The details of the torque-oil pressure conversion unit 108 and the reverse filter 109 will be explained according to a control block diagram in FIG. 6.

A transmission torque capacity T in each of the release side friction engagement element and the engage side friction engagement element and also a friction coefficient $\mu$ of each friction engagement elements are input to the torque-oil pressure conversion unit 108.

The friction coefficient $\mu$ is set based upon a clutch velocity v set by the kind of gear change and a turbine rotation speed Nt.

At the torque-oil pressure conversion unit 108, an indicated oil pressure P is calculated by the transmission capacity T, the friction coefficient $\mu$, a clutch area A, a return spring force Frtn, a number of clutches N and a clutch diameter D as follows.

$$P=1/A \ (Frtn+k \cdot T/N \mu D):(k \text{ is a constant})$$

On the other hand, the reverse filter 109 for filtering the indicated oil pressure P (transient-time oil pressure compensation filter) is a filter for setting, by using Laplace transformation, a transformation function (transmission function)=$(s^2+2\xi real \omega real \ s+\omega real^2)/(s^2+2\xi tgt \omega tgts+\omega tgt^2)$, and a filter gain G A I Natf=$\omega^2 tgt/\omega^2 real$, provided that a damping factor of an oil pressure control system is $\xi$(real, a target value of the damping factor is $\xi$(tgt, a natural frequency of the oil pressure control system is $\omega$ real and a target value of the natural frequency is $\omega$tgt.

The damping factor $\xi$real and the natural frequency $\omega$ real of the oil pressure control system are set corresponding to an ATF temperature (oil temperature).

In general, since the dynamic characteristic of an actual oil pressure to the indicated oil pressure has a waste time and a second-order lag, and the second-order lag is closely resembled by a transmission function with the natural frequency and the damping factor as parameters, an oil pressure response is deteriorated due to resonant at the natural frequency. Therefore, in order to offset the resonant point, a reverse filter is constituted by multiplication of a model identified to a system (actual transmission characteristic) and a norm model (target of a transmission characteristic) which does not show resonance at a transient response. Then the solenoid valve is controlled by processing an indicated value of the oil pressure with the reverse filter, to thereby improve the oil pressure response.

When the ATF temperature (oil temperature) rises up, the damping factor $\xi$real and the natural frequency $\omega$ real are increased. Therefore, the damping factor $\xi$real and the natural frequency $\omega$ real are changed in accordance with the ATF temperature (oil temperature) so that a reverse filter with good accuracy can be set.

To the engage side friction engagement element where the oil pressure is 0 before the start of gear change, the oil pressure is precharged at the start of gear change, as will be described later. Since an oil passage includes air at the time of precharging, the natural frequency $\omega$ real on the torque phase and the like is low and also the natural frequency $\omega$ real is changed depending on an elapsed time from the precharging start. Accordingly, there is used another map table which shows the damping factor $\xi$real and the natural frequency $\omega$real in accordance with the ATF temperature (oil temperature) and an elapsed time t from the precharging start correlating to a change in air mixture. At the time of precharging, the damping factor $\xi$real and the natural frequency $\omega$real obtained by retrieving this map are used, to thereby secure the oil pressure response in precharging operation.

Figure 7:
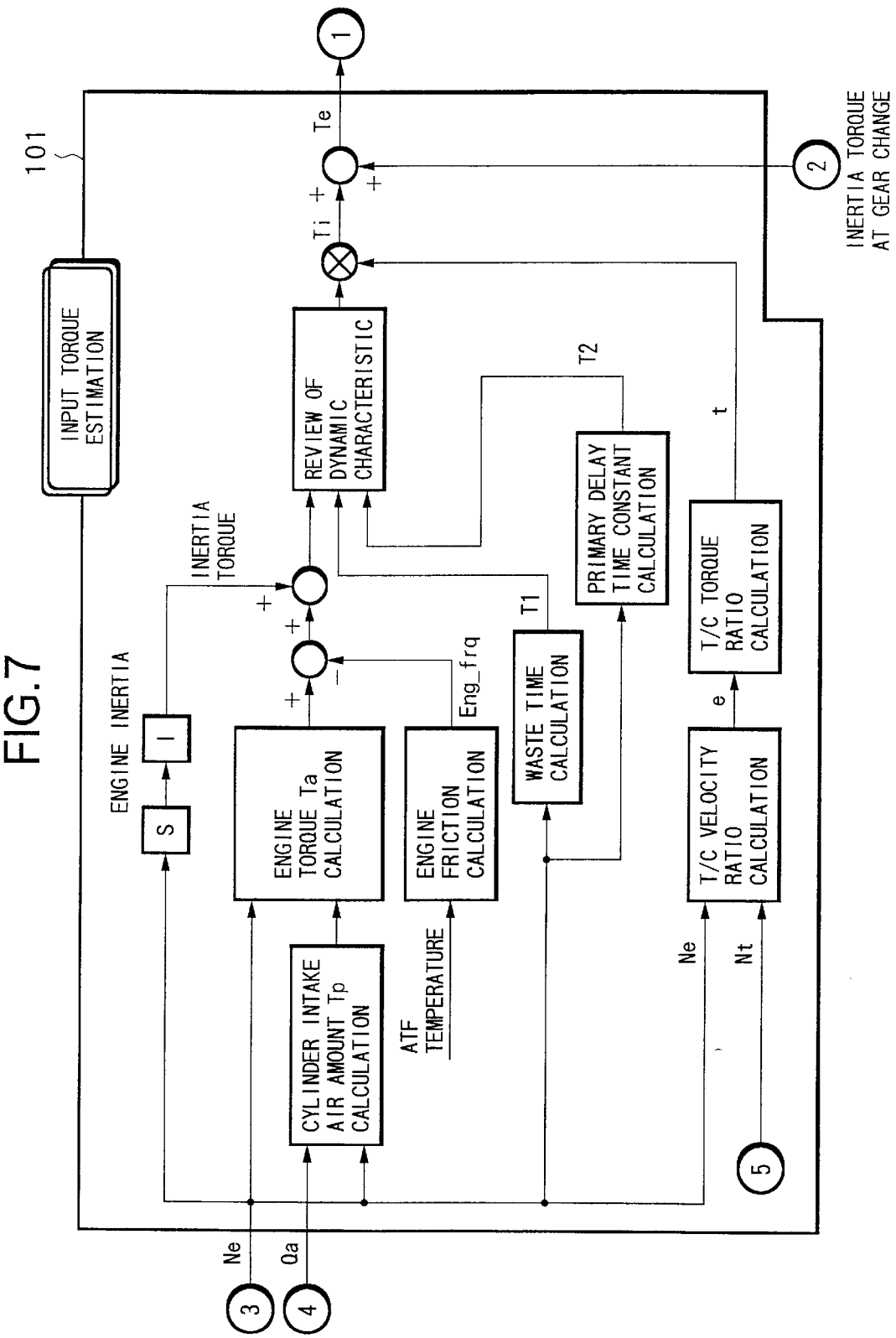
FIG. 7 is a control block diagram showing a block estimating an input shaft torque.

Details of the input shaft torque estimation unit 101 will be explained according to a block diagram in FIG. 7.

At the input shaft torque estimation unit 101, a cylinder intake air quantity Tp is obtained based upon an engine rotation speed Ne [rpm] and an intake air quantity Qa [litter/h], and a generated engine torque [Nm] is obtained based upon the cylinder intake air quantity Tp and the engine rotation speed Ne.

An engine friction amount is estimated based upon the temperature of operating oil (ATF) of the automatic transmission (hereinafter, oil temperature) and the generated engine torque is corrected by subtracting the engine friction amount.

An engine inertia torque is obtained based upon a change engine rotation speed Ne, which is added to the generated engine torque.

The generated engine torque is subjected to retard correction based upon a dynamic characteristic (first-order lag and waste time) between an actual generated torque, and the engine rotation speed Ne and the intake air quantity Qa. A transmission function in the retard correction is set as $e^{-T1s}/(1+T2s)$ and each of a waste time constant T1 and a first-order lag time constant T2 is set corresponding to the engine rotation speed Ne.

A speed ratio of torque converter is calculated based upon the engine rotation speed Ne and the turbine rotation speed Nt, and a torque ratio of torque converter is obtained based upon the speed ratio.

A turbine torque is obtained by multiplying the generated engine torque subjected to retard correction by the torque ratio, and further at the time of gear change, the turbine torque is corrected by a gear change time inertia torque corresponding to a rotation change during the gear change, to determine a final input shaft torque.

The gear change time inertia torque is calculated based upon an inertia moment corresponding to the kind of gear change, a target gear change time, a change in gear ratio and a target acceleration obtained based upon the turbine rotation speed at the start of inertia phase.

A setting control of each transmission torque capacity in the release side friction engagement element and the engage side friction engagement element, namely, details of the release FF control unit 102, the engage FF control unit 103, the OWC control unit 105 and the rotation F/B control unit 107 will be explained as follows, referring to a time chart in FIG. 4.

In the following, the explanation will be given provided that the transformation of the transmission torque capacity to the oil pressure will be simply executed by using a constant.

Figure 8:
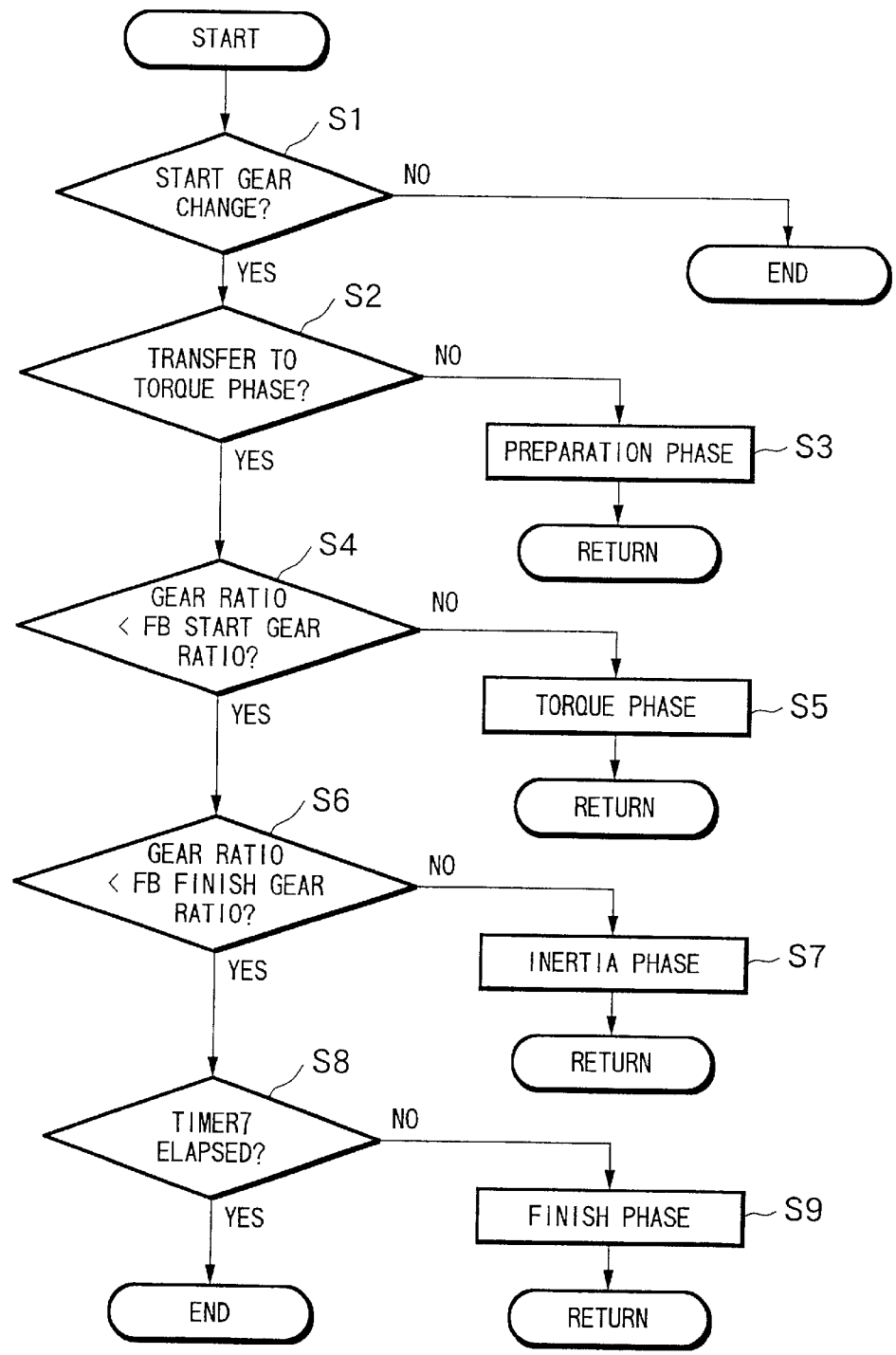
FIG. 8 is a flowchart showing a main routine of a gear change control by replacing the friction engagement elements in the embodiment.

A flowchart in FIG. 8 shows a main routine of torque capacity control in common with the release side friction engagement element and the engage side friction engagement element.

At Step S1, it is judged whether or the gear change is a power-on upshift.

At the A/T controller 12, a gear change map is stored beforehand which sets speed change steps corresponding to a vehicle speed VSP and an accelerator opening degree (throttle opening degree). For example, when a current speed change step (before gear changing) is different from a speed change step retrieved from the gear change map and is in the upshift direction, and also an accelerator is not fully closed, it is judged that the gear change is the power-on upshift.

When it is judged that the gear change is a power-on upshift, the routine goes to Step S2 wherein it is judged whether or not the gear change state has been transferred to the torque phase. For example, a reference turbine rotation speed is obtained by multiplying an output shaft rotation speed No [rpm] of the speed change mechanism by a gear ratio before gear changing (gear ratio=the turbine rotation speed Nt/the output shaft rotation speed No). Then, when an input shaft rotation speed (turbine rotation speed) Nt [rpm] of the speed change mechanism is changed to exceed a range of the reference turbine rotation speed± a hysteresis value HYS, it is judged whether or not the gear change state has been transferred to the torque phase.

If it is judged that the gear change status is prior to the transfer to the torque phase, a preparation phase routine in Step S3 is executed.

The preparation phase routine in Step S3 is branched to a release side routine and an engage side routine.

Figure 9:
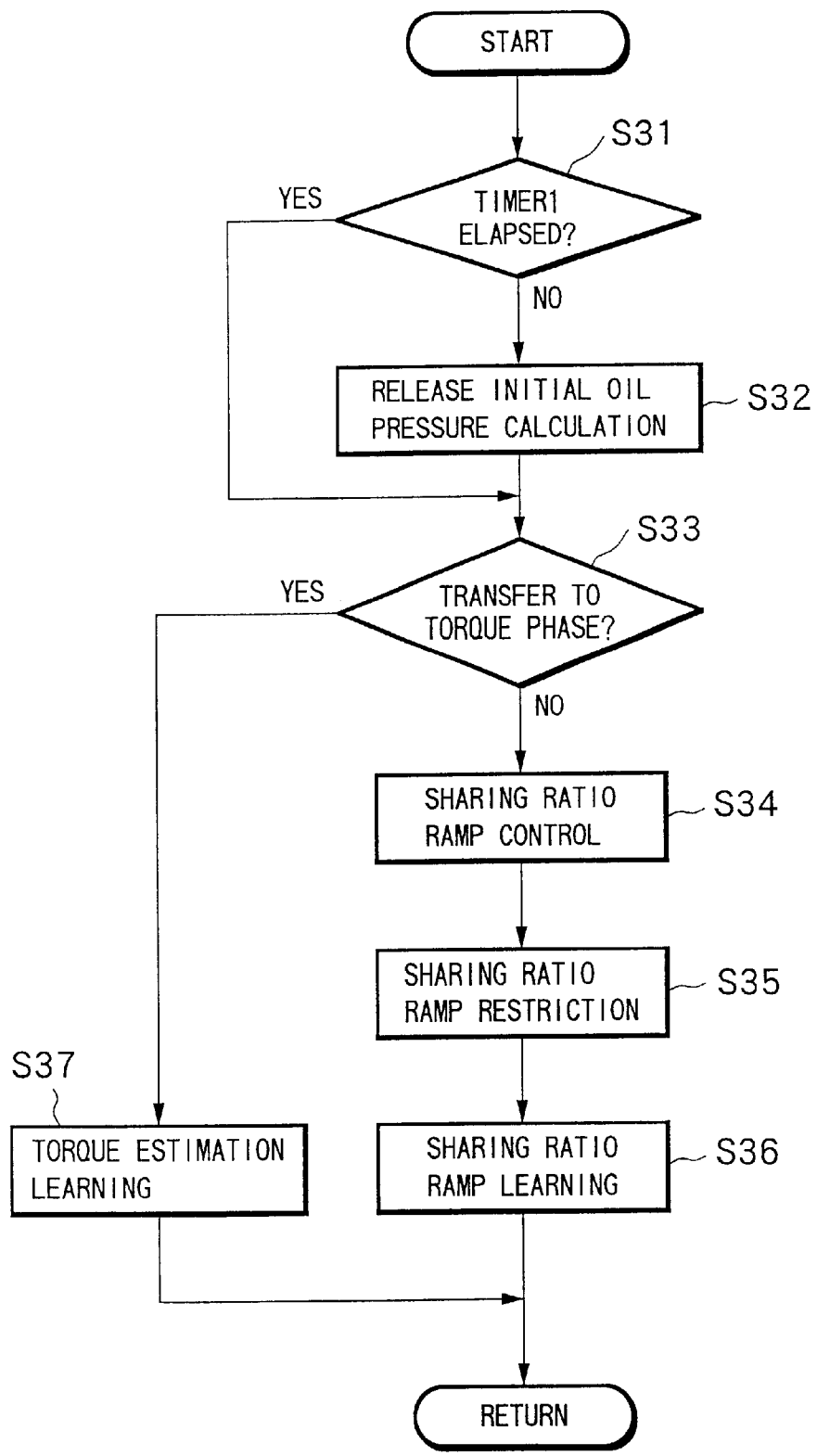
FIG. 9 is a flowchart showing a preparation phase process of a release side friction engagement element.

A flowchart in FIG. 9 shows a main routine of the preparation phase routine of the release friction engagement elements. At Step S31, it is judged whether or not a predetermined time TIMER1 that is stored beforehand based upon the kind of speed change step, the kind of friction engagement element to be subjected to releasing control and an oil temperature, has elapsed from the gear change judgment time.

When the elapse time is within the predetermined time TIMER1, the routine goes to Step S32 wherein an initial release oil pressure is calculated. The initial release oil pressure is an initial pressure for carrying out a releasing control. The oil pressure is controlled to be lowered to the initial release pressure from the oil pressure at non-gear change time within the predetermined time TIMER1.

Figure 10:
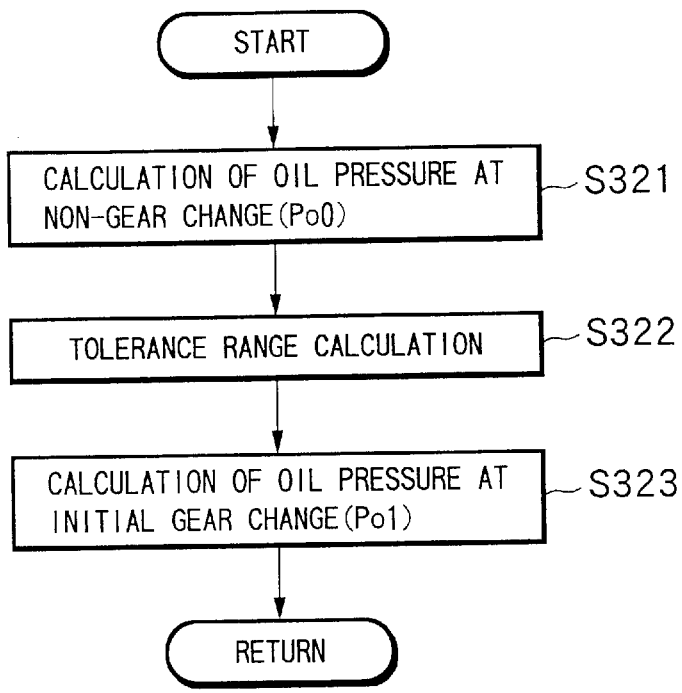
FIG. 10 is a flowchart showing an oil pressure calculation at initial release in the preparation phase process of the release side friction engagement element.

The calculation of the initial release oil pressure at Step S32 is shown in detail in a flowchart of FIG. 10. At Step S321, an oil pressure Po0 (indicated pressure) at non-gear change time of a friction engagement element to be subjected to releasing control is calculated according to the following formula.

*Po*0 (oil pressure at non-gear change time)=*K*1×(*Tt*×*Tr-o*)×an initial value of tolerance range+*Prtn-o*.

K1 is a coefficient for transforming the transmission torque capacity of the release side friction engagement element into the oil pressure, and is stored beforehand based upon the kind of speed change step and the kind of friction engagement elements to be subjected to releasing control. Tt is an estimation value of the input shaft torque of the speed change mechanism. Tr-o is a critical release torque ratio for obtaining a critical transmission torque capacity at a point where the release side friction engagement element starts to slide. The initial value of tolerance range is a correction coefficient for adding a torque capacity as a tolerance range to the critical transmission torque capacity and is stored, for example, as a value of 3.0 or so beforehand. Prtn-o is a stand-by pressure at release side (release side return spring pressure) and is stored beforehand for each of friction engagement elements.

At Step S322, the tolerance range is calculated as a value to be lowered to a target value (tolerance range (1)) after the elapse of the predetermined time TIMER1 from the tolerance range initial value (3.0). Specifically, the tolerance range corresponding to the elapse time t is obtained as follows.

Tolerance range=initial value×(1−gain α+t$^{1/2}$)

When the target value of tolerance range (tolerance range (1)) after the elapse of the predetermined time TIMER1 is 1.2, α is determined by substituting the predetermined time TIMER1 for t and substituting 1.2 for the tolerance range. Then, by using this gain α, the tolerance range for each elapsed time t can be obtained.

The target value of tolerance range after the elapse of the predetermined time TIMER1 is set as a value so that the release side friction engagement element can be held in the engagement state even if an estimation error of input shaft torque occurs within a predictable range.

At Step S323, a release side oil pressure Po1 within the predetermined time TIMER1 is calculated according to the following equation by using the tolerance range for each elapsed time t obtained as above.

$$Po1=K1 \times (Tt \times Tr-o) \times \text{tolerance range} + Prtn-o$$

After the release side oil pressure is lowered gradually within the predetermined time TIMER1 in Step S32, the routine goes to Step S34 and the subsequent steps if it is judged that the gear change state has not transferred to the torque phase in Step S33.

At Step S34, a sharing ratio ramp control is carried out.

Figure 11:
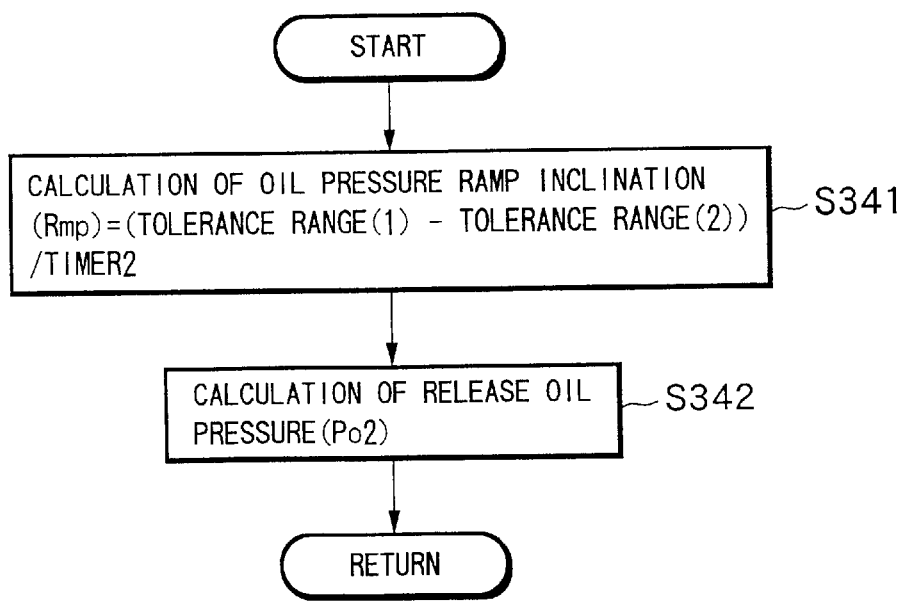
FIG. 11 is a flowchart showing a sharing ratio ramp control in the preparation phase process of the release side friction engagement element.
Figure 12:
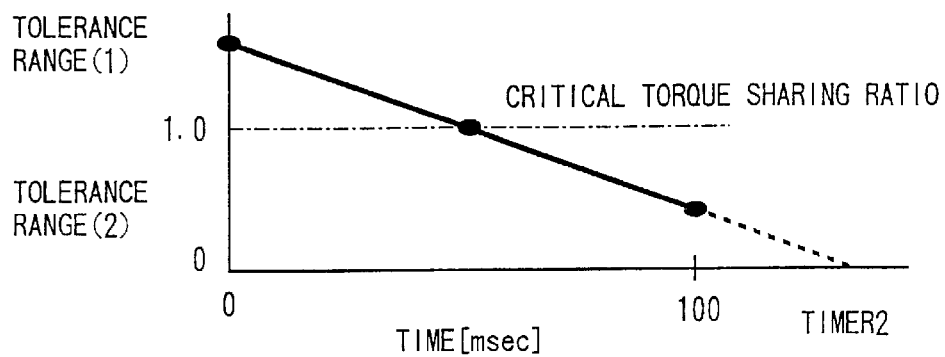
FIG. 12 is a graph showing a change of tolerance range in the sharing ratio ramp control.

Details of the sharing ratio ramp control at Step S34 are shown in a flowchart in FIG. 11. At Step S341, a tolerance range within a predetermined time TIMER2 that is stored beforehand based upon the kind of gear change and the kind of friction engagement elements to be subjected to releasing control, is determined so that the tolerance range is lowered at a constant velocity from the tolerance range (1) to a tolerance range (2) (for example, 0.8) within a predetermined time TIMER2 (refer to FIG. 12).

At Step S342, a release side oil pressure Po2 is calculated according to the following equation by using the tolerance range determined at the Step S341.

$$Po2=K1 \times (t \times Tr-o) \times \text{tolerance range} + Prtn-o$$

The tolerance range (2) (=0.8) is set as a value so that the release side friction engagement element can be securely transferred to the release state even if the estimation error of input shaft torque occurs within a predicable range.

At Step S35, a sharing ratio ramp restriction is carried out.

Figure 13:
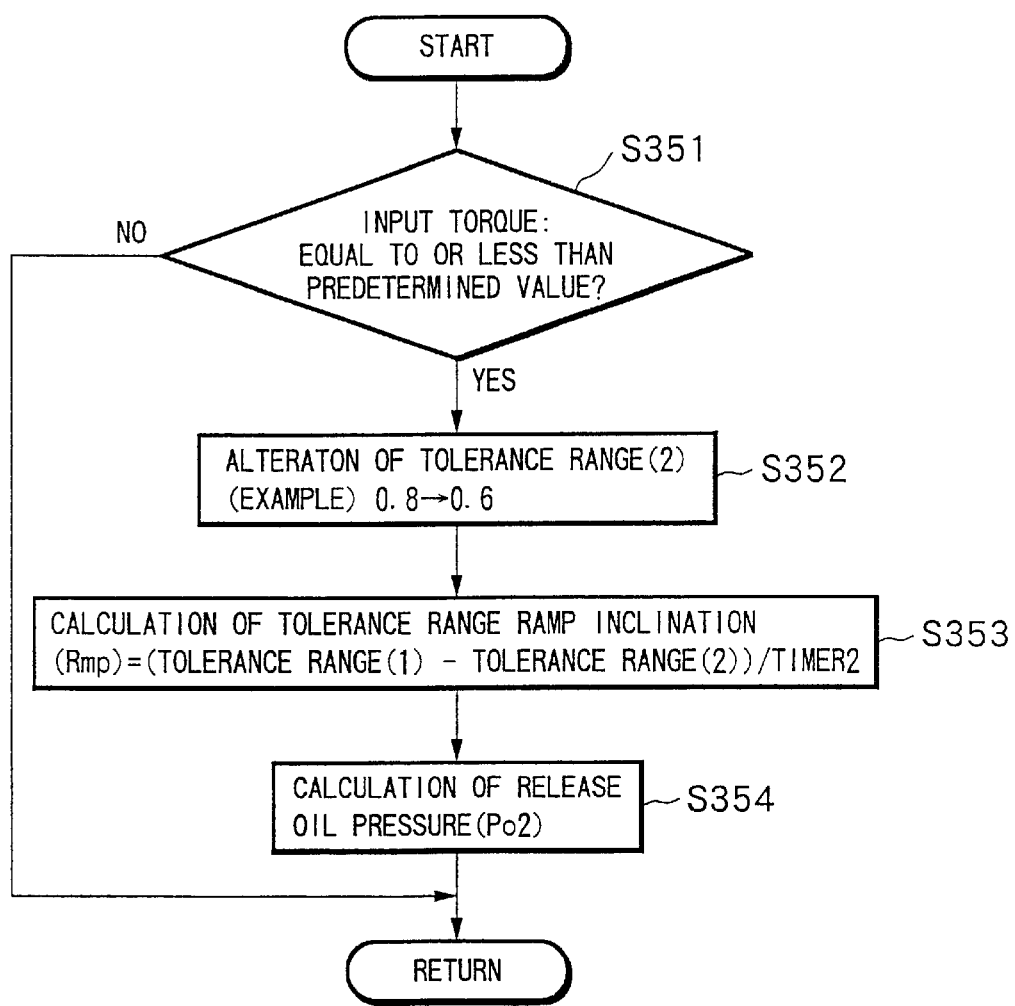
FIG. 13 is a flowchart showing a sharing ratio ramp restriction in the preparation phase process of the release side friction engagement elements.

Details of the sharing ratio ramp restriction at Step S35 are shown in a flowchart in FIG. 13. At Step S351, it is judged whether or not an input shaft torque Tt is equal to or less than a predetermined value.

When the input shaft torque Tt exceeds the predetermined value, the routine skips Steps S352–S354 to end in order to use the release side oil pressure Po2 calculated at Step S34. When the input shaft torque t is equal to or less than the predetermined value, the routine goes to Step S352.

At Step S352, the tolerance range (2) is altered to be a smaller value. For example, when a standard value is 0.8, it is altered to 0.6. As the result of this alteration, a change velocity of tolerance range (the release side oil pressure Po2) is increased, which prevents a gear change time from being prolonged at the time of low torque.

At Step S353, the tolerance range within the predetermined time TIMER2 is determined again based upon the tolerance range (2) after altered, in the same way as at Step S341.

At Step S354, the release side oil pressure Po2 is calculated based upon a newly determined tolerance range.

At Step S36, a sharing ratio ramp learning is carried out.

Figure 14:
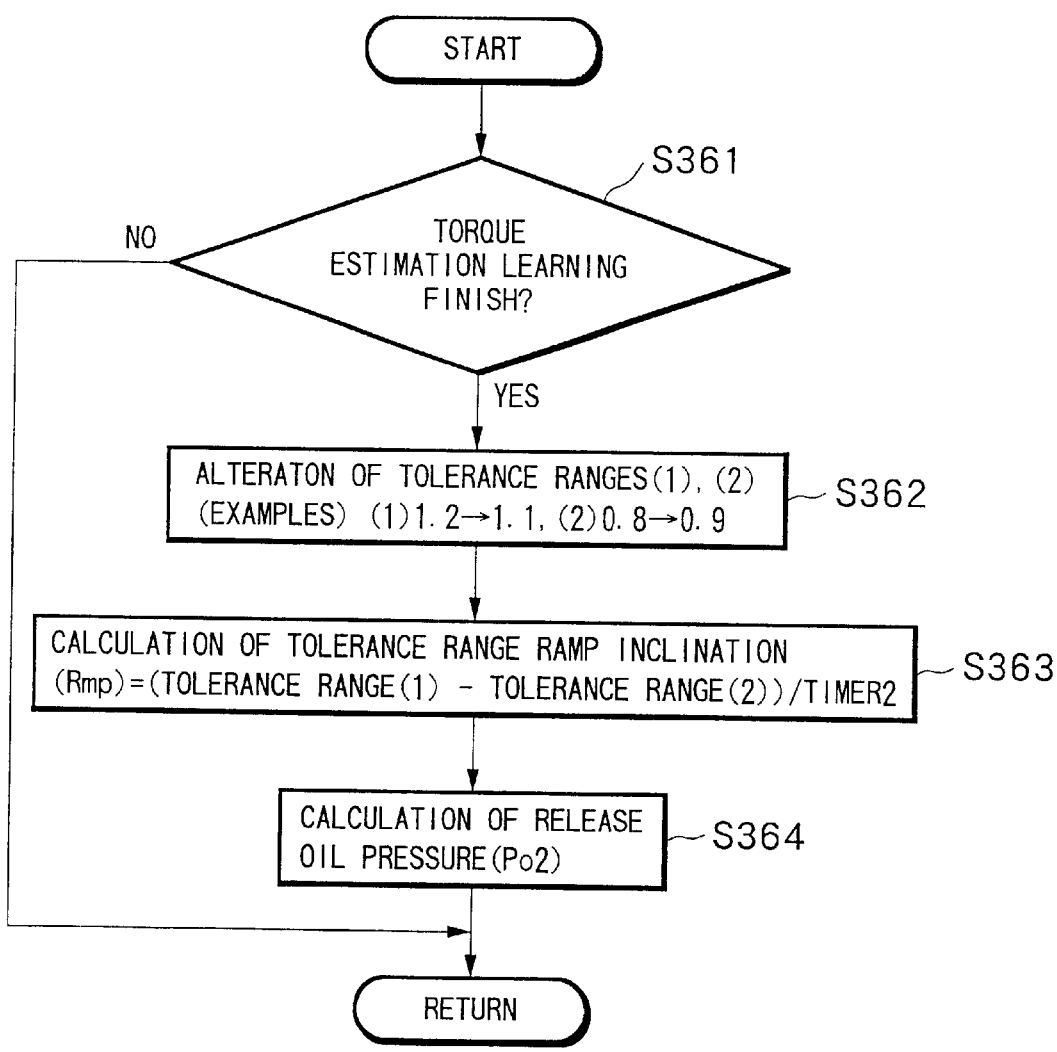
FIG. 14 is a flowchart showing a sharing ratio ramp learning in the preparation phase process of the release side friction engagement element.

Details of the sharing ratio ramp at Step S36 are shown in a flowchart in FIG. 14. At Step S361, it is judged whether or not a torque estimation learning for correcting an estimation error of the input shaft torque Tt is converged. The torque estimation learning will be described later.

When it is judged that the torque estimation learning is converged at Step S361, the routine goes to Step S362, wherein the tolerance ranges (1) and (2) each is altered to close to a value of 1.0 so that an inclination of tolerance range within the predetermined time TIMER2 becomes gentle. For example, the tolerance range (1) is altered from 1.2 to 1.1 and the tolerance range (2) is altered from 0.8 to 0.9. As the result of the alteration of the tolerance ranges, a rotation change at an initial torque phase can be slowed and a control performance at the torque phase can be improved.

At Step S363, a tolerance range within the predetermined time TIMER2 is determined again based upon the tolerance ranges (1) and (2) after altered, in the same way as at Step S341.

At Step S 364, a release side oil pressure Po2 is calculated based upon the tolerance range determined newly.

The change of tolerance range within the predetermined time TIMER1 is also altered accompanying the alteration of the tolerance range (1).

When the release side oil pressure is reduced gradually within the predetermined time TIMER2 according to the reduction setting of tolerance range as described above, the racing state of engine is detected where the turbine rotation speed Nt is higher than the addition value of the reference turbine rotation (No×gear ratio) and the hysteresis value HYS, to thereby indirectly confirm that the release side transmission torque capacity is lowered close to a critical value.

Here, it is an ideal that, at a point when the tolerance range reaches close to 1.0, the turbine rotation speed Nt becomes higher than the addition value of the reference turbine rotation (No×gear ratio) and the hysteresis value HYS. However, if there is an estimation error of the input shaft torque Tt, the racing of engine occurs after the tolerance range becomes greater than or less than 1.0. Therefore, it is required that a change range of tolerance range within the predetermined time TIMER2 is held to be wide around the center of 1.0 (for example, 1.2~0.8) in consideration of the estimation error of the input shaft torque Tt.

Assuming that the gear ratio has been started to change at the release side oil pressure equivalent to the tolerance range=1.1, since the input shaft torque Tt was estimated as smaller than an actual value, it is judged that the friction engagement element has started to slide although the oil pressure is sufficient to hold an engagement state because of an enough transmission torque capacity. On the other hand, assuming that the gear ratio has started to change at the release side oil pressure equivalent to the tolerance range=0.9, since the input shaft torque Tt was estimated as greater than the actual value, it is judged that the friction engagement element has started to slide in delay although the oil pressure (transmission torque capacity) was already lowered to a value incapable of holding an engagement state.

Accordingly, at a point when the turbine rotation speed Nt gets greater for the first time than the addition value of the reference turbine rotation (No×gear ratio) and the hysteresis value HYS, the routine goes to Step S37, wherein a torque estimation learning is made for obtaining a correction coefficient to correct the input shaft torque estimation value based upon the tolerance range at that time.

Figure 15:
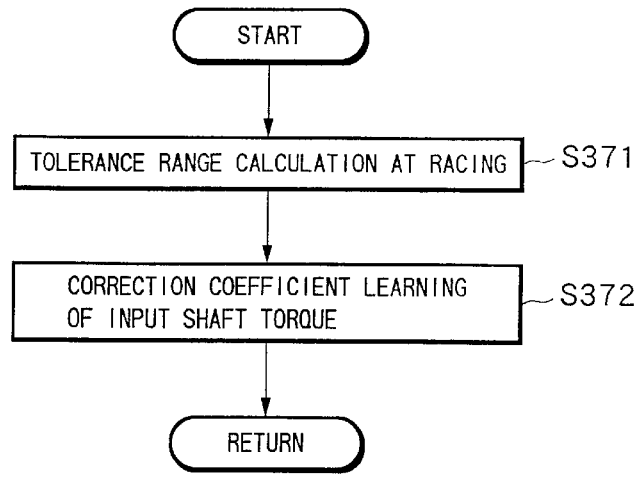
FIG. 15 is a flowchart showing a torque estimation learning in the preparation phase process of the release side friction engagement element.

Details of the torque estimation learning at Step S37 are shown in a flowchart in FIG. 15. At Step S371, there is obtained the tolerance range of when the turbine rotation speed Nt gets higher for the first time than the addition value of the reference turbine rotation (No×gear ratio) and the hysteresis value HYS. Since detection of racing is delayed, it is preferable that a tolerance range before a predetermined time from the point when it is judged that the turbine rotation speed Nt gets higher for the first time than the addition value of the reference turbine rotation (No×gear ratio) and the hysteresis value HYS, is set as a tolerance range at racing occurrence time.

Figure 16:
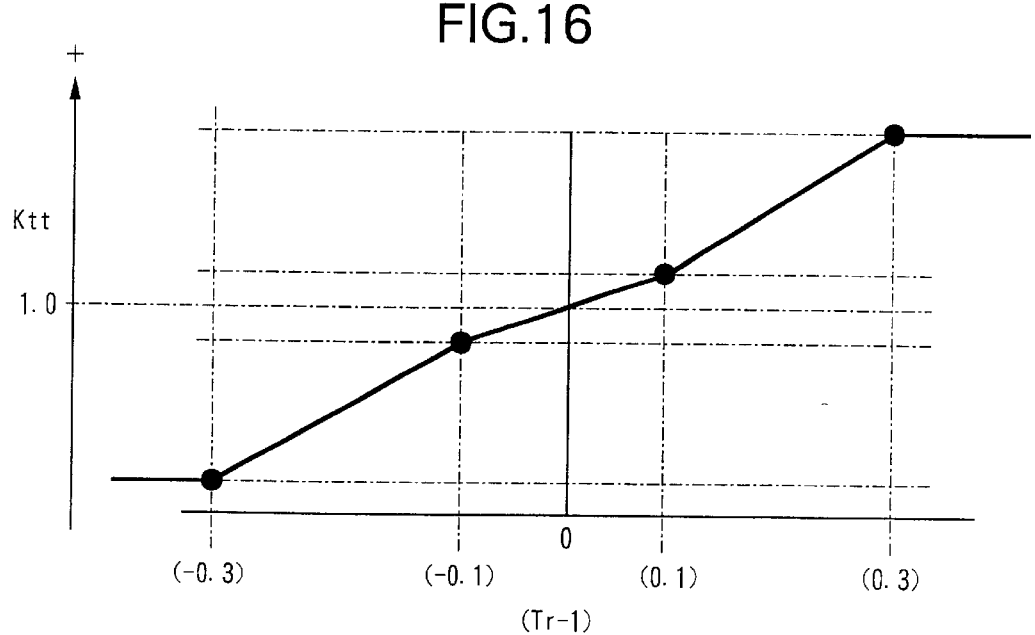
FIG. 16 is a graph showing characteristics of a correction coefficient of an input shaft torque in the torque estimation learning.

At Step S372, as shown in FIG. 16, is stored beforehand a table for storing a correction coefficient Ktt of the input shaft torque corresponding to a deviation (Tr−1) between 1.0 and the tolerance range Tr at the engine racing occurrence, and a correction coefficient Ktt is obtained by referring to the table based upon the tolerance range obtained at the Step S371.

The correction coefficient Ktt is set to 1.0 when the tolerance range Tr is 1.0, to a smaller value than 1.0 when the tolerance range Tr is smaller than 1.0, and to a greater value than 1.0 when the tolerance range Tr is greater than 1.0. The estimation value of the input shaft torque Tt is corrected so that the engine racing occurs when the tolerance range Tr is 1.0.

When the correction coefficient Ktt is set, learning is made so that the input shaft torque is estimated including a correction demand based upon the correction coefficient Ktt. The correction coefficient Ktt is restricted to be within predetermined upper and lower limit values, and learning of the correction coefficient Ktt is made when the ATF temperature is equal to or higher than a predetermined temperature.

Figure 17:
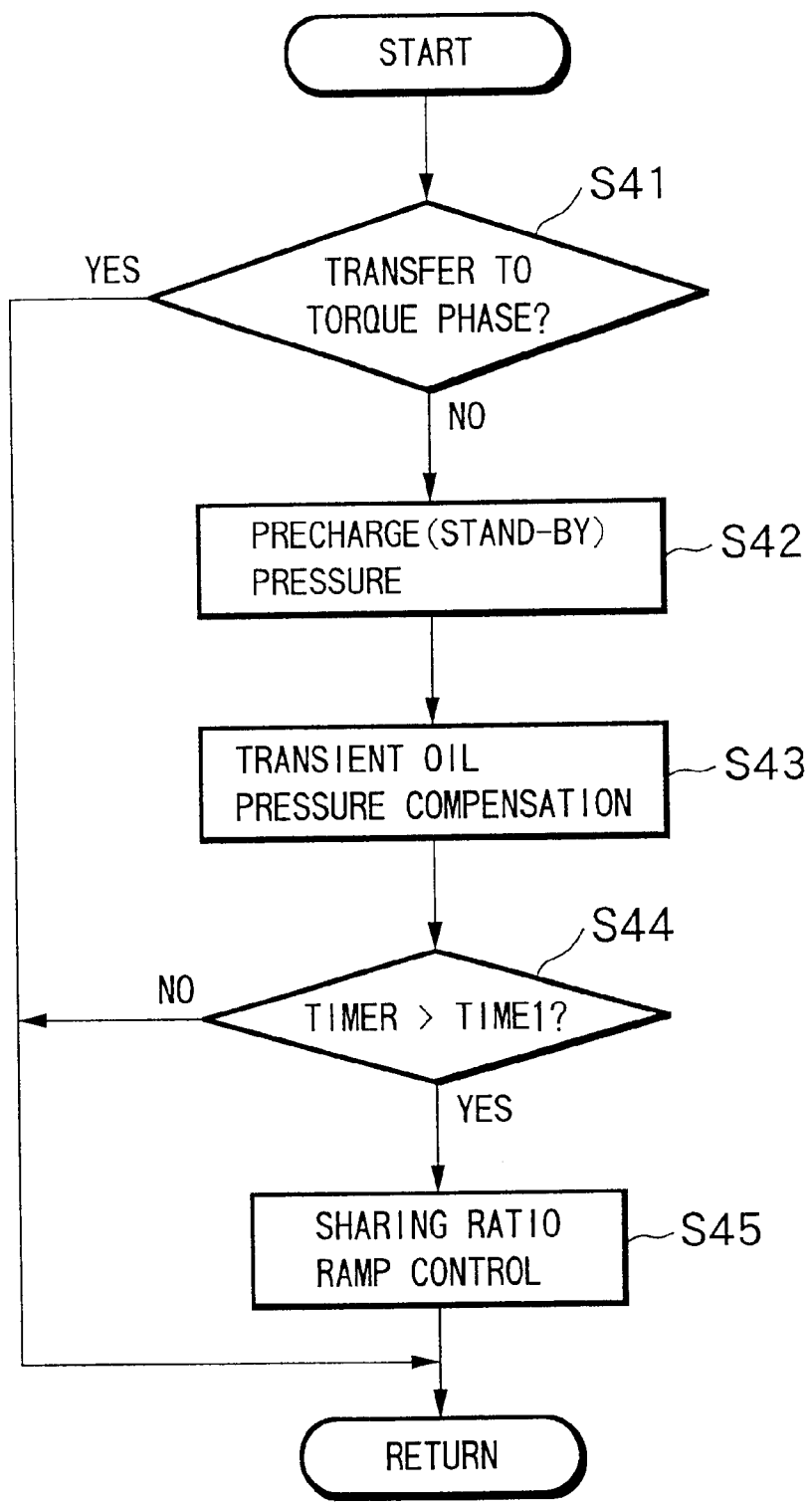
FIG. 17 is a flowchart showing a preparation phase process of an engage side friction engagement element.

Meanwhile, the engage side preparation phase routine is shown in a flowchart in FIG. 17.

At Step S41, a transfer to a torque phase is judged.

Then, the routine goes to Step S42 during the preparation phase until the transfer to the torque phase is judged.

At Step S42, a reference precharge pressure (stand-by pressure) of the engage side friction engagement element is set corresponding to the kind of friction engagement elements.

At Step S43, a damping factor $\xi real$ and a natural frequency $\omega real$ used at the reverse filter (transient time oil pressure compensation filter) 109 are retrieved from a map for precharging based upon the ATF temperature and an elapsed time t from the start of precharging. Then, the reference precharge pressure (stand-by pressure) is processed by the reverse filter 109 based upon the damping factor $\xi real$ and the natural frequency $\omega real$ retrieved from the map for precharging and a result is output as a final engage side oil pressure Pc0.

At Step S44, it is judged whether or not an elapsed time from the gear change start judgment exceeds the predetermined time TIMER1. When it exceeds the predetermined time TIMER1, the routine goes to a sharing ratio ramp control at Step S45.

Figure 18:
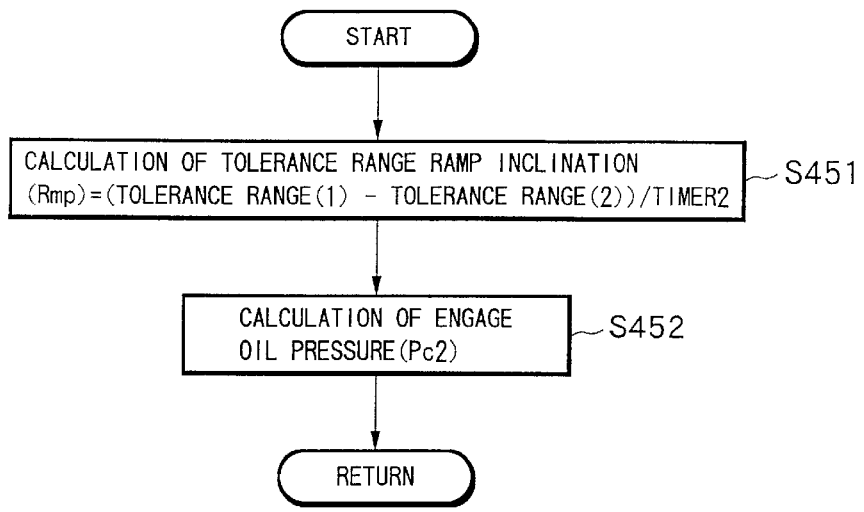
FIG. 18 is a flowchart showing a sharing ratio ramp control in the preparation phase process of the engage side friction engagement element.
Figure 19:
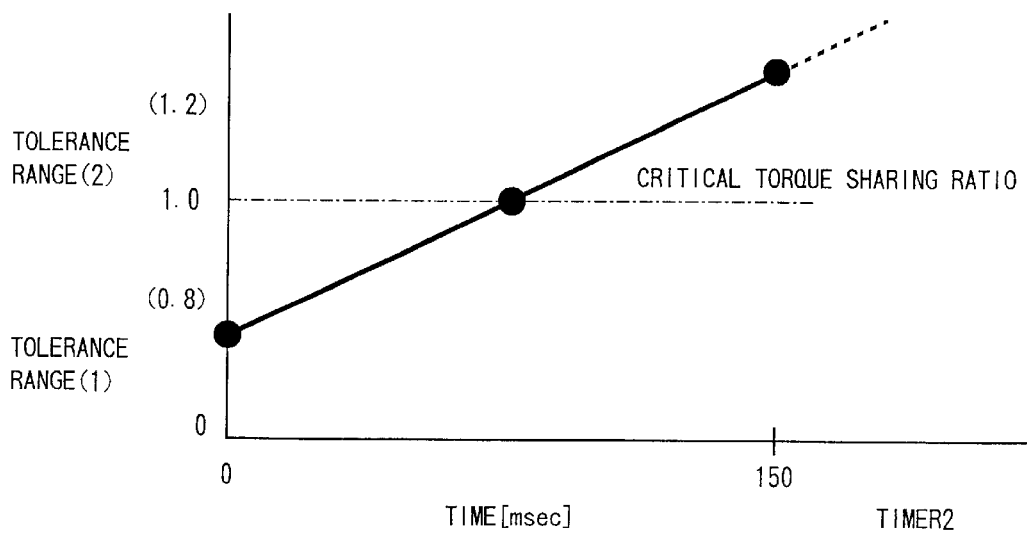
FIG. 19 is a graph showing a change of tolerance range of a sharing ratio ramp control of the engage side friction engagement element.

Details of the sharing ratio ramp control at Step S45 are shown in a flowchart in FIG. 18. At Step S451, a tolerance range within the predetermined time TIMER2 is determined so that a tolerance range is increased within the predetermined time TIMER2 from the tolerance range (1) (for example, 0.8) to the tolerance range (2) (for example, 1.2) at a constant velocity (see FIG. 19).

At Step S452, the engage side oil pressure Pc2 is calculated according to the following equation by using the tolerance range determined at Step S451.

$$Pc2 = K2 \times (Tt \times Tr-c) \times \text{tolerance range} + Prtn-c$$

K2 is a coefficient for transforming the transmission torque capacity (required transmission torque capacity) of the engage side friction engagement element into an oil pressure and is stored beforehand corresponding to the kind of gear change and the kind of friction engagement elements to be subjected to engage control. Tr-c is a critical engage torque ratio for obtaining a critical transmission torque capacity at which the engage side friction engagement element starts to be engaged to the input shaft torque Tt. Prtn-c is an engage side stand-by pressure (engage return spring pressure) and is stored beforehand for each friction engagement element.

Back to the flowchart in FIG. 8, when it is judged that there is the transfer to the torque phase at Step S2, the routine goes to Step S4, wherein it is judged whether or not the gear ratio is changed to the upshift direction exceeding a F/B (feedback) start gear ratio. Then, the torque phase routine at Step S5 is processed until the gear ratio is changed to the upshift direction exceeding the F/B start gear ratio from the judgment of engine racing.

At the torque phase routine (OWC control) of the engage side friction engagement element, a final release side oil pressure Po4 is obtained by adding a correction oil pressure Po3 for restricting the racing by compensation for a lack of transmission torque capacity to the release side oil pressure Po2 obtained by keeping the reduction control of the tolerance range at the preparation phase at the same velocity.

Figure 20:
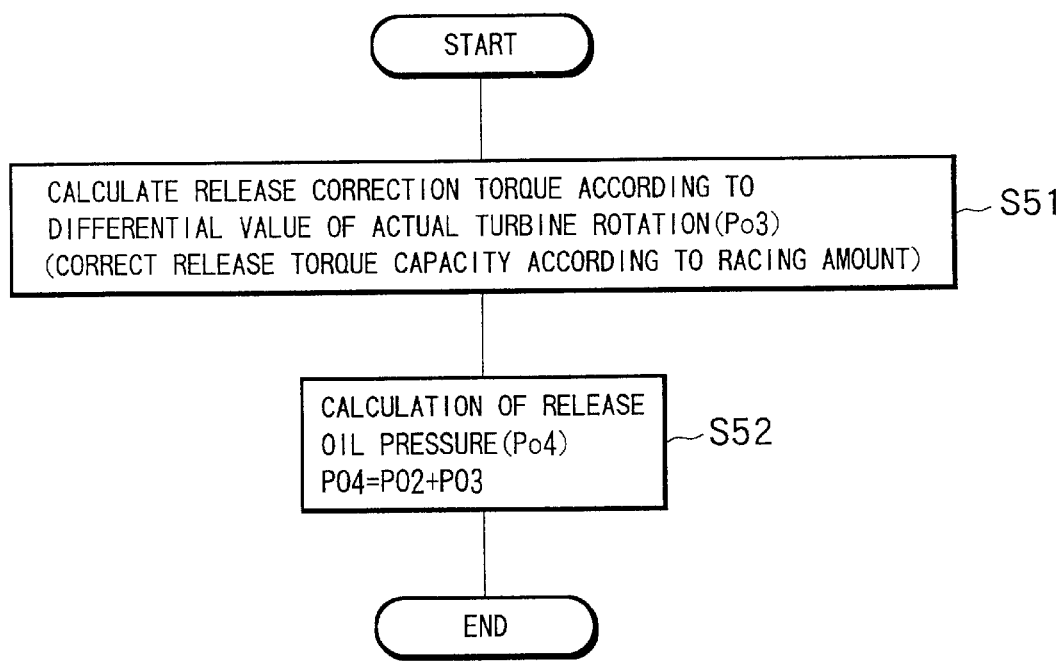
FIG. 20 is a flowchart showing a torque phase process of the release side friction engagement element.

Namely, as shown in a flowchart in FIG. 20, first at Step S51, the release side correction oil pressure Po3 corresponding to a differential value $\Delta Nt$ of the turbine rotation speed Nt and a change amount of the turbine rotation speed Nt is calculated according to the following equation.

$$Po3 = K1 \times \{INS \times (2\pi/60) \times \Delta Nt + 1/g(Nt - No \times i)\}$$

INS is an inertia moment determined for each kind of gear change, and g is a gain for transforming the clutch torque into the rotation speed and is set corresponding to the kind of gear change and the turbine rotation speed Nt. Further, i is a gear ratio before gear changing, and No×i is a reference turbine rotation speed (a reference input shaft rotation speed).

Either one of a first correction value obtained as $K1 \times INS \times (2\pi/60) \times \Delta Nt$ or a second correction value as $K1 \times 1/g \times (Nt - No \times i)$ may be set as a final correction value. However, an addition value of the first correction value for correcting the transmission torque capacity corresponding to the inertia torque accompanied with rotation change and the second correction value equivalent to an increasing change of rotation, may be set as a final correction value to thereby correct a lack of transmission torque capacity more accurately with a good response and restrict the racing more efficiently.

A correction of oil pressure (transmission torque capacity) corresponding to the differential value $\Delta Nt$ of the turbine rotation speed Nt for restricting the racing by compensating for the lack of transmission torque capacity may be made to at least either one of the release side or the engage side.

At Step S52, the release side correction oil pressure Po3 is added to the release side oil pressure Po2 calculated based upon the tolerance range set by keeping the reduction control of the tolerance range at the preparation phase at the same velocity and the addition result is set as a final release side oil pressure Po4 (Po4=Po2+Po3).

The release side final oil pressure Po4 is limited so that it may not become lower than the release side oil pressure Po2.

As the differential value $\Delta Nt$ of the turbine rotation speed Nt to be used for calculating the release side correction oil pressure Po3, a value after a low pass filter process is used.

Figure 21:
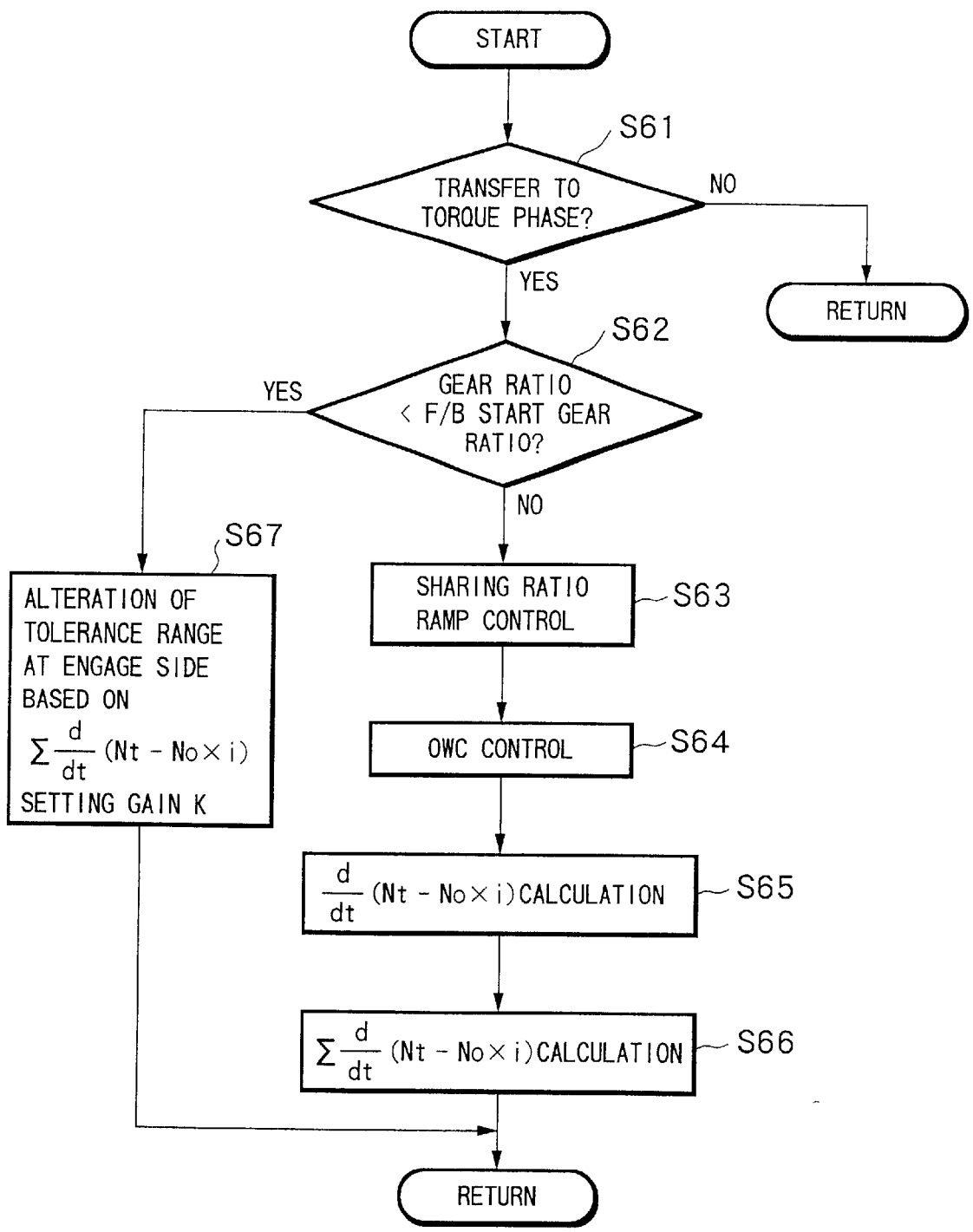
FIG. 21 is a flowchart showing a torque phase process of the engage side friction engagement element.

On the other hand, the torque phase routine of the engage side friction engagement element is shown in a flowchart in FIG. 21.

In the flowchart in FIG. 21, at Step S61, when the transfer to the torque phase is judged, the routine goes to Step S62, wherein it is judged whether or not the gear ratio has been changed to the upshift direction exceeding the F/B start gear ratio. When it has not exceed the F/B start gear ratio, the routine goes to Step S63.

At Step S63, the engage side oil pressure Pc2 is obtained based upon the tolerance range set by keeping the increase control of the tolerance range at the preparation phase at the same velocity.

At Step S64, the engage side oil pressure Pc3 is calculated according to the following equation in the same manner as at Step S51.

$$Pc3=K2\times\{INS\times(2\pi/60)\times\Delta Nt+1/g(Nt-No\times i)\}$$

Then, the engage side final oil pressure Pc4 is obtained as Pc2+Pc3=Pc4.

At Step S65, a differential value of a deviation between the turbine rotation speed Nt (input shaft rotation speed) and the reference turbine rotation speed (No×gear ratio i before gear changing; reference input shaft rotation speed) is calculated as the racing amount showing a change amount of turbine rotation speed Nt.

$$\text{Racing amount}=d/dt\cdot(Nt-No\times i)$$

The racing amount is a change amount of turbine rotation speed Nt per unit time and the change amount is calculated as a deviation to the reference turbine rotation speed (No×i).

In the above description, the word "racing amount" is used for convenience and when $d/dt\cdot(Nt-No\times i)$ is plus, it shows an increase change of rotation caused by the racing and when $d/dt\cdot(Nt-No\times i)$ is minus, it shows a reduction change of rotation caused by torque drag.

At Step S66, the racing amount obtained during the torque phase is integrated to obtain a racing amount integration value.

$$\text{Racing amount integration value}=\Sigma(d/d\ t\cdot(Nt-No\times i))$$

At Step S62, when it is judged that the gear ratio has been changed to the upshift direction exceeding the F/B start gear ratio and the transfer from the torque phase to the inertia phase is detected, the routine goes to Step S67, wherein the alteration gain k of the tolerance range to be used for calculating the engage side oil pressure (transmission torque capacity) is determined based upon the racing amount integration value obtained by integrating the racing amount during the torque phase.

Figure 22:
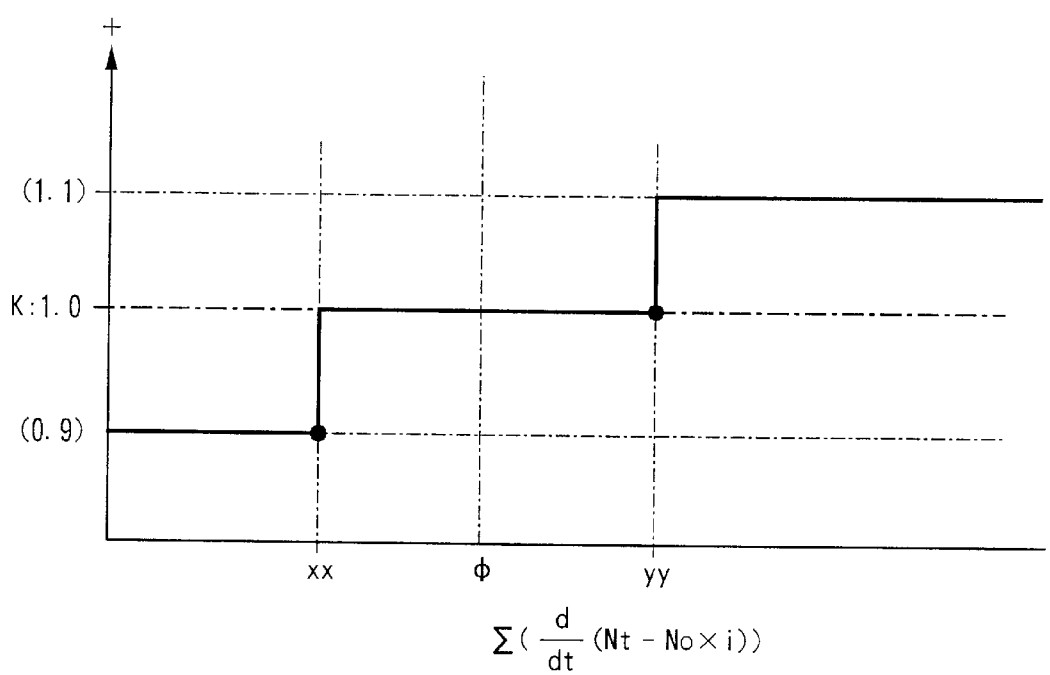
FIG. 22 is a graph showing characteristics of change gains of tolerance range set in the aforesaid torque phase process.

Specifically, as shown in FIG. 22, when the racing amount integration value is greater than a plus predetermined value yy, a value greater than 1.0 (for example, 1.1) is set as the alteration gain K and when the racing amount integration value is smaller than a minus predetermined value xx, a value smaller than 1.0 (for example, 0.9) is set as the alteration gain value K, and further, when the racing amount integration value is equal to or smaller than the plus predetermined value yy and equal to or greater than the minus predetermined value xx, 1.0 is set as the alteration value K so that the tolerance range may not be altered substantially.

The alteration gain K is multiplied by the engage side tolerance range to be subjected to ramp control and the result of the multiplication is used for calculating the engage side oil pressure as the final tolerance range. At Step S45 and Step S63, the tolerance range set by the basic ramp control is correctively set by the alteration gain K.

When it is judged that the racing amount integration value is greater than the plus predetermined value yy, and the racing exceeding a predetermined amount (rotation increase) occurs, if a value greater than 1.0 is set as the alteration value K, the tolerance range to be used for calculating the engage side oil pressure is offset to a greater value at the preparation phase through torque phase. As a result, the transmission torque capacity balance where the engage side oil pressure (transmission torque capacity) is increased while maintaining the release side oil pressure (transmission torque capacity) is altered, to thereby restrict the racing.

On the other hand, when it is judged that the racing amount integration value is smaller than the minus predetermined value xx and the torque drag (rotation decrease) exceeding a predetermined amount occurs, if a value smaller than 1.0 is set as the alteration gain K, the tolerance range to be used for calculating the engage side oil calculation is offset to a smaller value at the preparation phase through the torque phase. As a result, a transmission torque capacity balance where the engage side oil pressure (transmission torque capacity) is reduced while maintaining the release side oil pressure (transmission torque capacity) is altered to thereby restrict the torque drag.

In an example shown in FIG. 22, in the case that the racing amount integration value is greater than the plus certain value yy and is smaller than the minus certain value xx, the same alteration gain K is set, but characteristics of alteration gain K to the racing amount integration value is not limited and the constitution may be such that the alteration gain K may be set in multi-stage.

In the above embodiment, the alteration gain K is set from the racing amount integration value. The constitution may be such that peak value of the racing amount is obtained as a parameter to judge the magnitude of the racing or the torque drag and the alteration gain K is set based upon the peak value.

Figure 23:
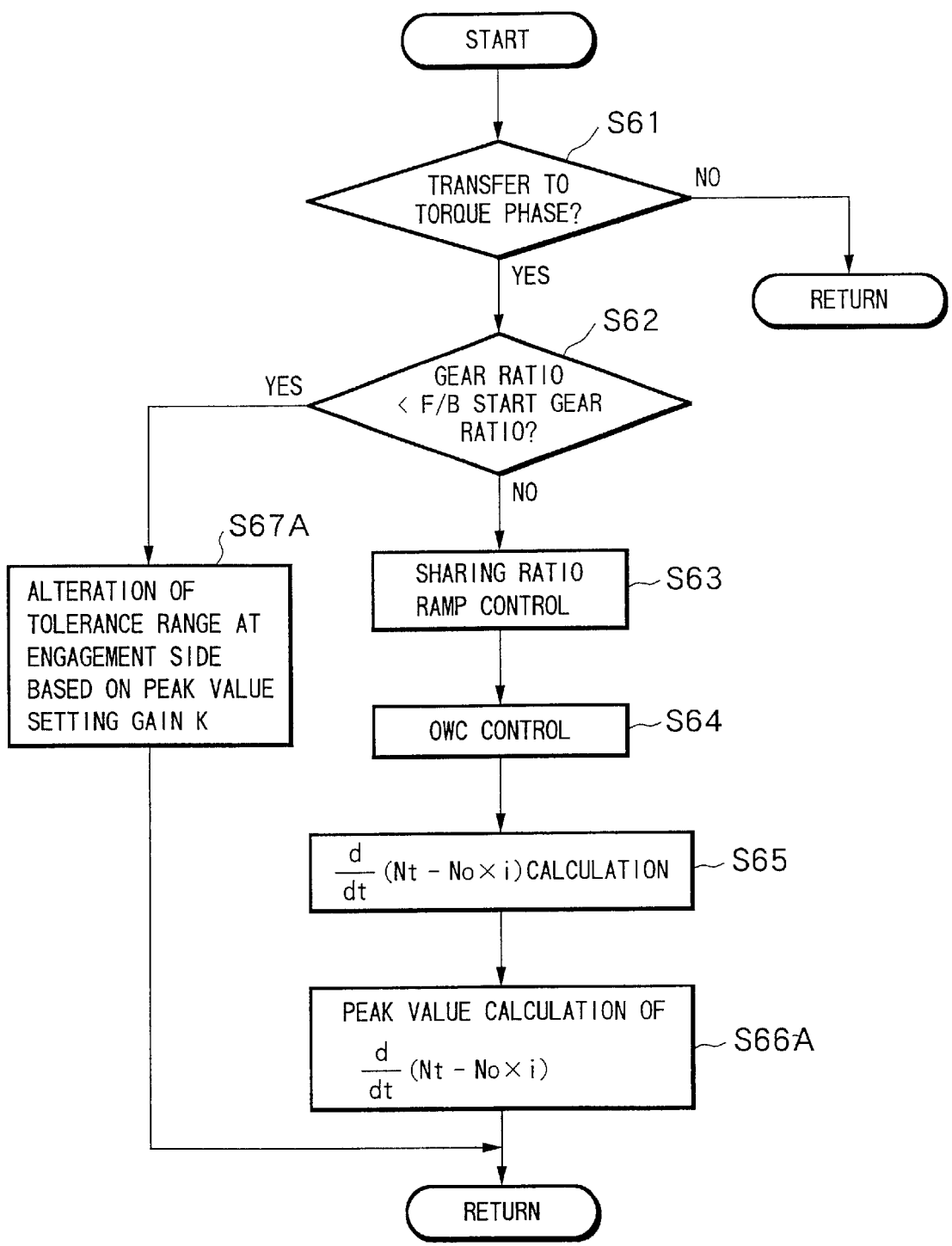
FIG. 23 is a flowchart showing another embodiment of the torque phase process of the engage side friction engagement element.

A flowchart in FIG. 23 shows a setting control of the alteration gain K based upon the peak value. The routines of Step S61~65 are the same as in the flowchart in FIG. 21.

At Step S66A, the greatest absolute value (peak value) is updated subsequently and stored from the racing amount obtained at Step S65.

When the transfer from the torque phase to the inertia phase is judged, the routine goes to S67A, wherein the alteration gain K is set based upon the peak value.

When it is judged that the peak value exceeds the plus predetermined value and the turbine rotation speed rises up greatly from the reference turbine rotation speed caused by the racing, the engage side oil pressure (transmission torque capacity) is offset to an increase direction by setting the alteration gain K to a value greater than 1.0. When it is judged that the peak value exceeds the minus predetermined value and the turbine rotation speed is lowered greatly from the reference turbine rotation speed due to the torque drag, engage side oil pressure (transmission torque capacity) is offset to a decrease direction by setting the alteration gain K as a smaller value than 1.0.

In the flowchart in FIG. 23, the alteration gain K is set from the peak value. The constitution may be such that the alteration gain K is set from a combination of the peak value and the torque phase time. According to this constitution, a control close to the setting control of the alteration gain K based upon the racing amount integration value may be simply carried out.

Figure 24:
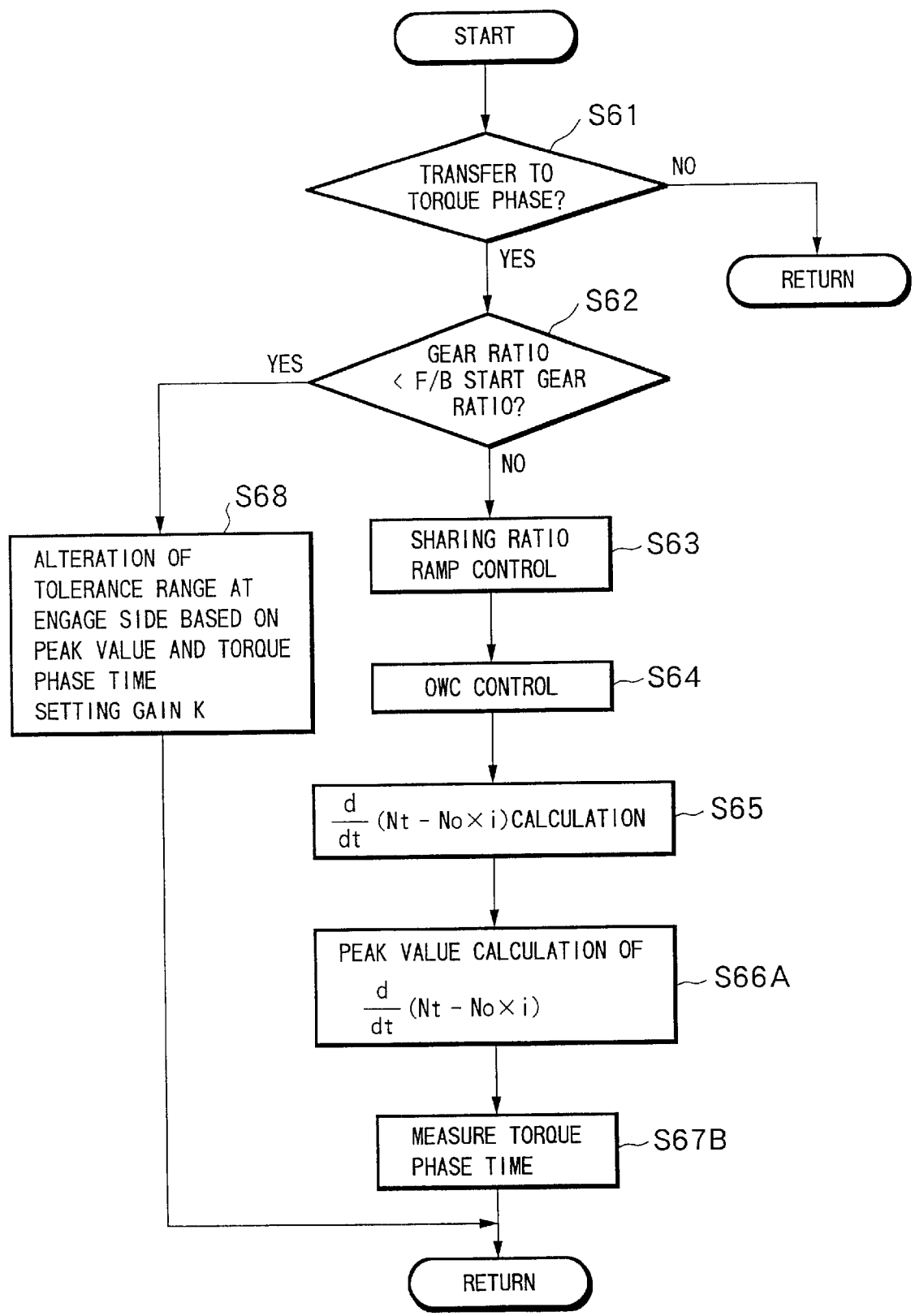
FIG. 24 is a flowchart showing yet another embodiment of the torque phase process of the engage side friction engagement element.

A flowchart in FIG. 24 shows a control to set the alteration gain K from the combination of the peak value and the torque phase time, and the routines of Steps S61~S65 are the same as in the flowchart in FIG. 21.

At Step S66A, the greatest absolute value (peak value) is updated subsequently and stored from the racing amount, and at Step S67B, the torque phase time is measured.

When the transfer from the torque phase to the inertia phase is judged, the routine goes to Step S68, wherein the alteration gain K is set based upon the peak value and the torque phase time.

At the alteration gain K setting at Step S68, when the peak value exceeds the plus predetermined value and also the torque phase time exceeds a predetermined time, the occurrence of a great racing is judged and the alteration gain K is set to a value greater than 1.0 so that the engage side oil pressure (transmission torque capacity) is offset to an increase direction. When the peak value exceeds the minus predetermined value and also the torque phase time exceeds the predetermined time, the occurrence of a great torque drag is judged and the alteration gain K is set to a value smaller than 1.0 so that the engage side oil pressure (transmission torque capacity) is offset to a decrease direction.

The constitution may be such that an absolute value of the peak value is corrected to increase when the torque phase time is longer than a predetermined time, and the alteration gain K is set based upon whether or not the corrected peak value exceeds the plus predetermined value or the minus predetermined value.

Further, in a simple way, whether it is the racing or the torque drag is judged based upon plus or minus of the racing amount. When it is the racing and the torque phase time exceeds the predetermined time, the engage side oil pressure (transmission torque capacity) may be offset to the increase direction by setting the alteration gain K to a greater value than 1.0. On the other hand, when it is the torque drag and the torque phase time exceeds the predetermined time, the engage side oil pressure (transmission torque capacity) may be offset to the decrease direction by setting the alteration gain K to a smaller value than 1.0.

Also, the alteration gain K may be set from the racing amount integration value and the torque phase time.

Figure 25:
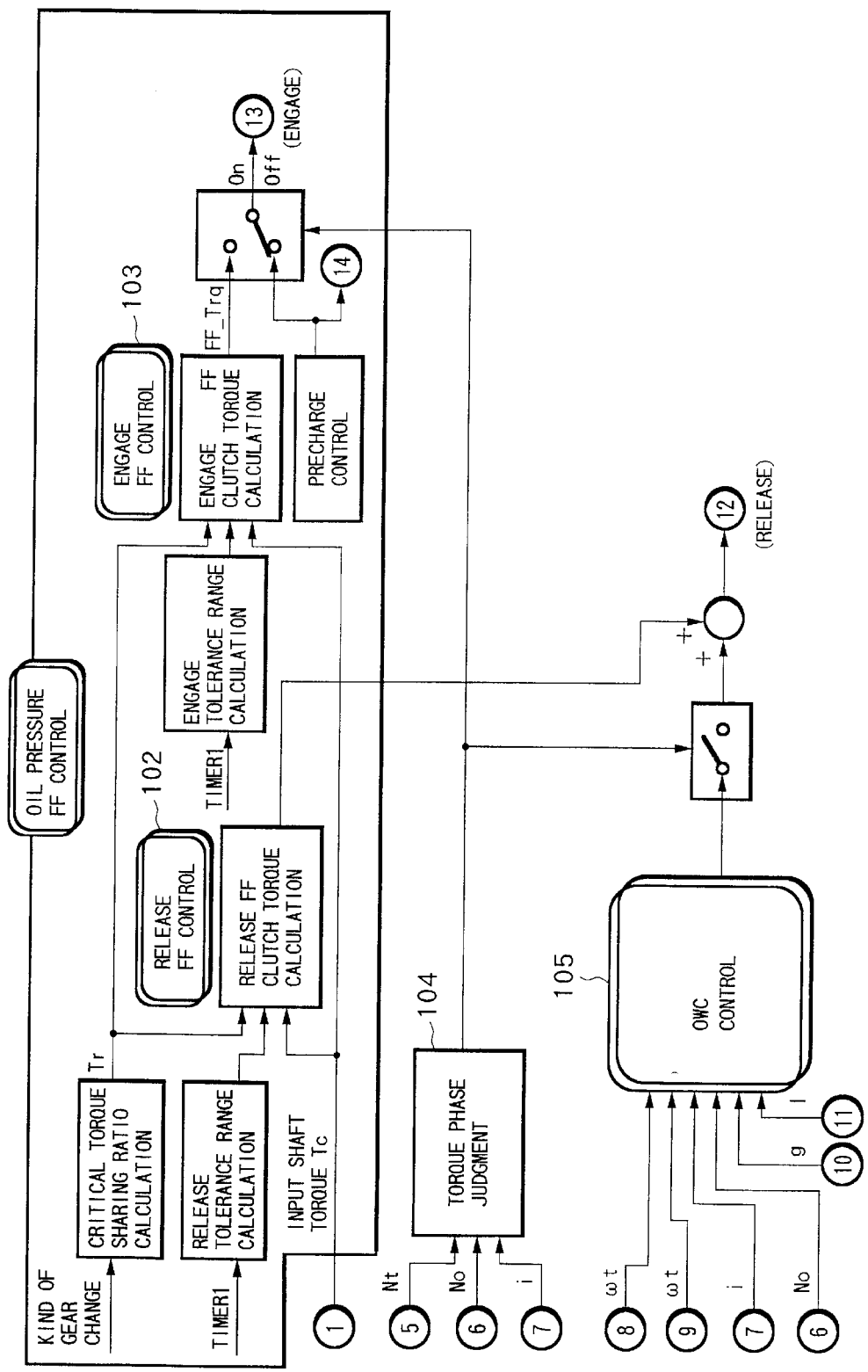
FIG. 25 is a control block diagram showing a block setting a feedforward amount of a demand torque capacity and carrying out a racing control.

A control until the torque phase of the release side friction engagement element and the engage side friction engagement element will be briefly explained according to a block diagram in FIG. 25.

Figure 5:
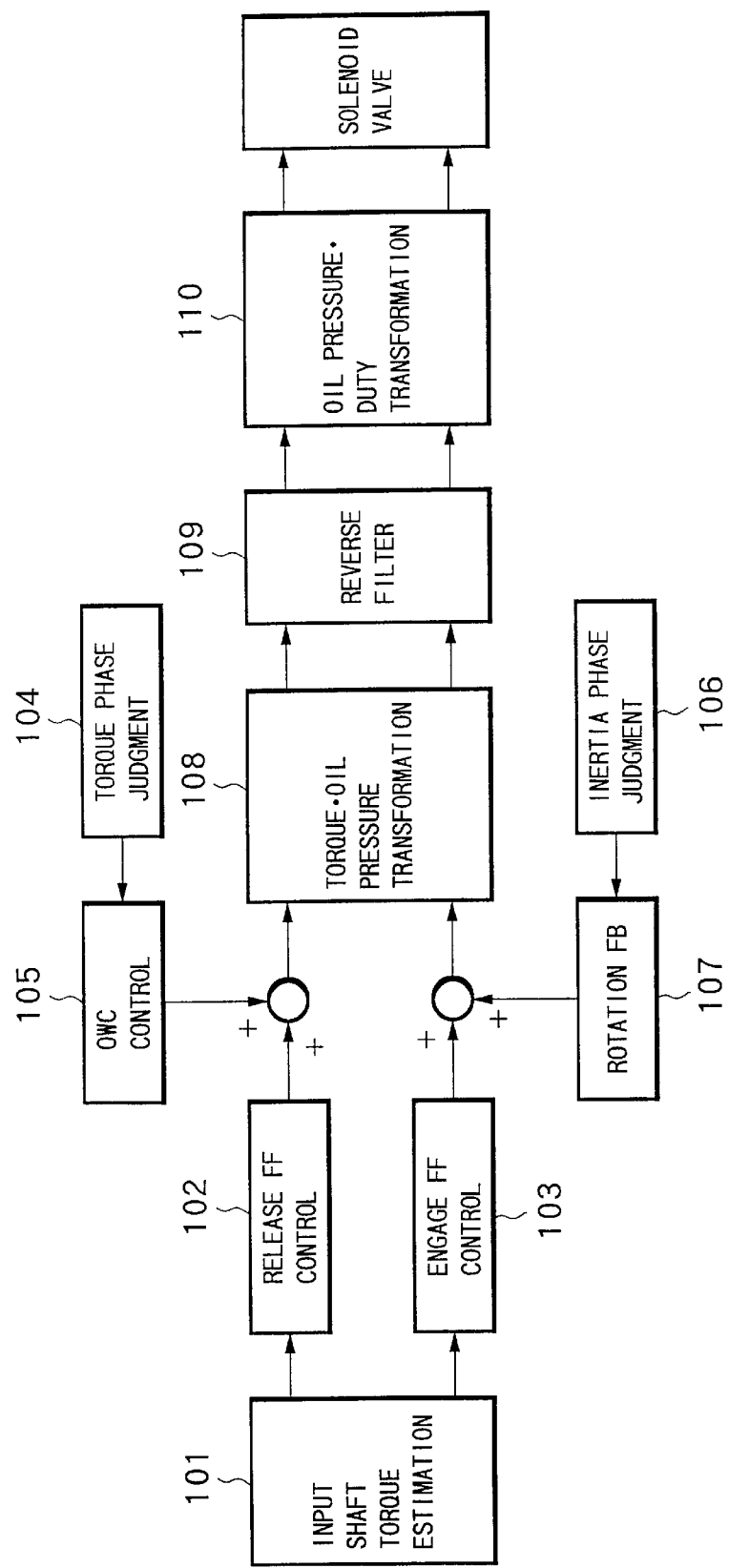
FIG. 5 is a control block diagram showing an entire control system in the automatic transmission.

The block diagram in FIG. 25 shows the detailed structure of the release side F/B control unit 102, the engage side F/B control unit 103, the torque phase judgment unit 104, and the OWC control unit 105, in FIG. 5.

The oil pressures at the release side and at the engage side are basically determined in a manner that a tolerance range is added to a critical torque obtained based upon the input shaft torque and a critical torque ratio corresponding to the kind of gear change. A precharging is made to the engage side oil pressure at the start of gear change.

The engage side oil pressure (torque capacity) is changed to increase as an increase of the tolerance range while the release side oil pressure is changed to decrease as a decrease of the tolerance range so that a sharing of a required torque capacity is gradually transferred from the release side to the engage side. Also, a correction corresponding to a change of the turbine rotation speed explained as the OWC control in the present embodiment is made to the racing caused by the lack of torque capacity.

In the control block diagram in FIG. 25, $\omega t$ shows a turbine rotation angular velocity and $\omega(dot)t$ is a differential value of the turbine rotation angular velocity $\omega t$. The correction result of the oil pressure (torque capacity) is the same as the Po3.

When it is judged that the gear ratio has exceeded the F/B start gear ratio at Step S4 in the flowchart in FIG. 8, the routine goes to Step S6, wherein it is judged whether or not the gear ratio exceeds a F/B finish gear ratio.

When the gear ratio is between the F/B start gear ratio and the F/B finish gear ratio, the inertia phase routine in Step S7 is processed.

Figure 26:
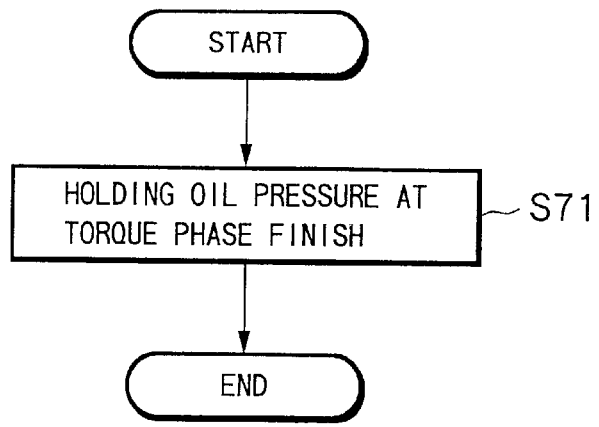
FIG. 26 is a flowchart showing an inertia phase process of the release side friction engagement element.

The inertia phase routine at the release side is shown in a flowchart in FIG. 26 and at Step S71 a setting of the oil pressure (oil pressure=0) to be held at a torque phase finish time is made.

Figure 27:
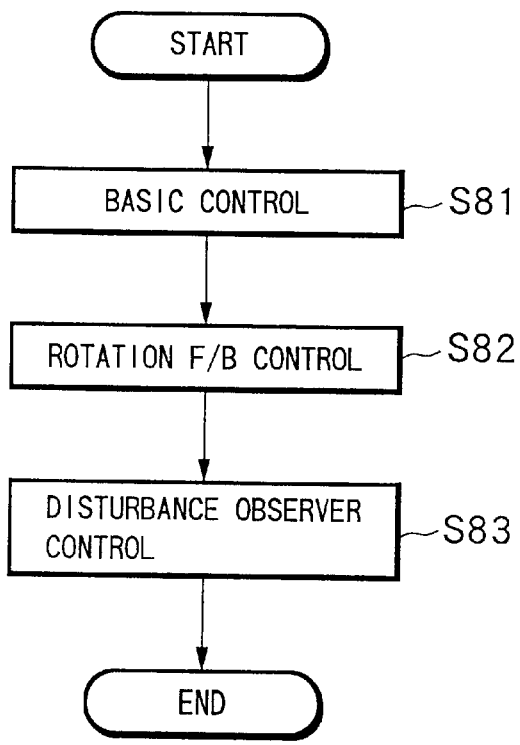
FIG. 27 is a flowchart showing an inertia phase process of the engage side friction engagement element.

The inertia phase routine at the engage side is shown in a flowchart in FIG. 27.

Figure 28:
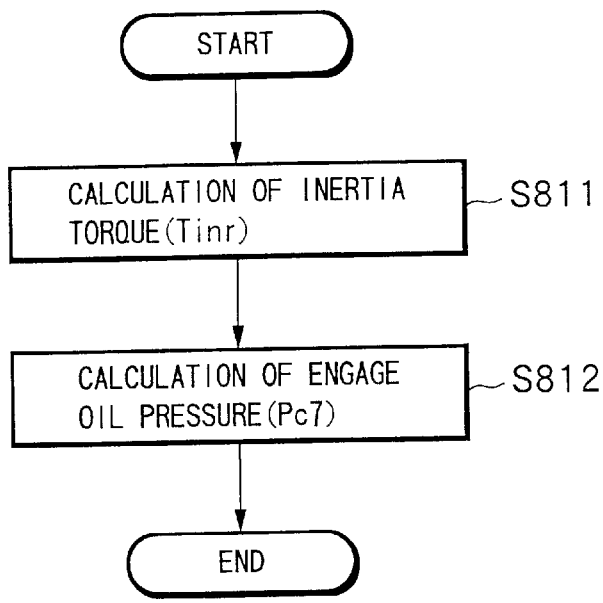
FIG. 28 is a flowchart showing a basic control in the inertia phase process of the engage side friction engagement element.

At Step S81, a basic control shown in a flowchart in FIG. 28 is carried out.

In the basic control, first the target inertia torque [Nm] is calculated according to the following equation at Step S811.

$$Tinr = \text{inertia } INS \times \text{target turbine angular acceleration [rad/sec}^2]$$

The inertia INS (inertia moment) [Nm/rad/sec$^2$] in the above equation is a value to be determined corresponding to the kind of gear change.

Target turbine angular acceleration [rad/sec$^2$] is calculated as:

$$\text{target turbine angular acceleration [rad/sec}^2] = 2 \times \pi \times \text{target turbine acceleration [1/sec]/60; and}$$

the target turbine acceleration [1/sec$^2$] is calculated as;

$$\text{the target turbine acceleration [1/sec}^2] = (Nt \times \text{gear step difference})/(\text{target gear change time [sec]}).$$

In the above equation, the gear step difference is a value calculated as gear step difference=1–(gear ratio after gear changing/gear ratio before gear changing), and Nt[rpm] is the turbine rotation speed at inertia phase start time At Step S812, an engage side oil pressure Pc7 is calculated according to the following equation based upon the target inertia torque Tinr.

$$Pc7 = K2 \times Tt \times Tr \times Tr\text{-}c + Prtn\text{-}c + K2 \times Tr\text{-}c \times Tinr$$

At Step S82, in addition to the above basic control, a rotation feedback (F/B) control is carried out.

Figure 29:
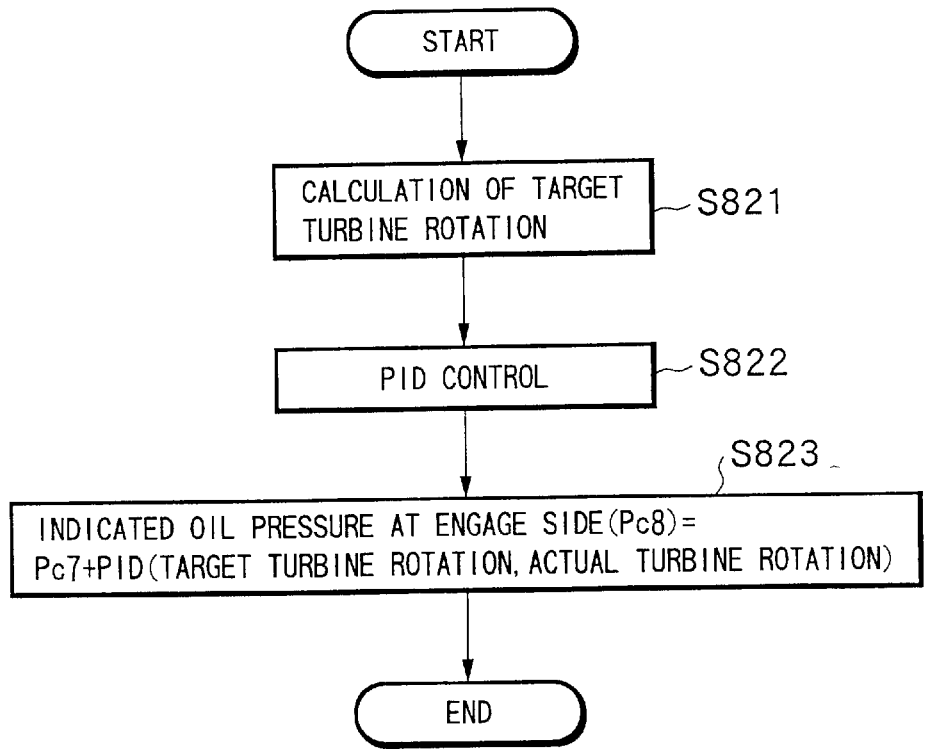
FIG. 29 is a flowchart showing a rotation feedback control in the inertia phase process of the engage side friction engagement element.

The rotation F/B control (rotation F/B control unit 107) will be explained according to a flowchart in FIG. 29.

At Step S821, a target turbine rotation speed [rpm] is calculated.

The target turbine rotation speed is calculated as characteristics for changing to decrease at a target turbine acceleration [1/sec$^2$] from the turbine rotation speed [rpm] at the inertia phase start time, based upon the turbine rotation speed [rpml] and the target turbine acceleration [a/sec$^2$] (target turbine velocity (n)=target turbine velocity (n–1)+ target turbine acceleration).

At Step S822, a feedback correction oil pressure is calculated by operations of proportional, integral and differential (PID) based upon a deviation between the target turbine rotation speed and an actual target turbine rotation speed (deviation=target turbine rotation speed—actual target turbine rotation speed).

At Step S823, an engage side oil pressure Pc8 is obtained by adding the feedback correction oil pressure to the engage side oil pressure Pc7.

At Step S83, a control named as a disturbance observer control in the present embodiment is carried out in parallel with the P I D operations to get the target turbine rotation speed.

Figure 30:
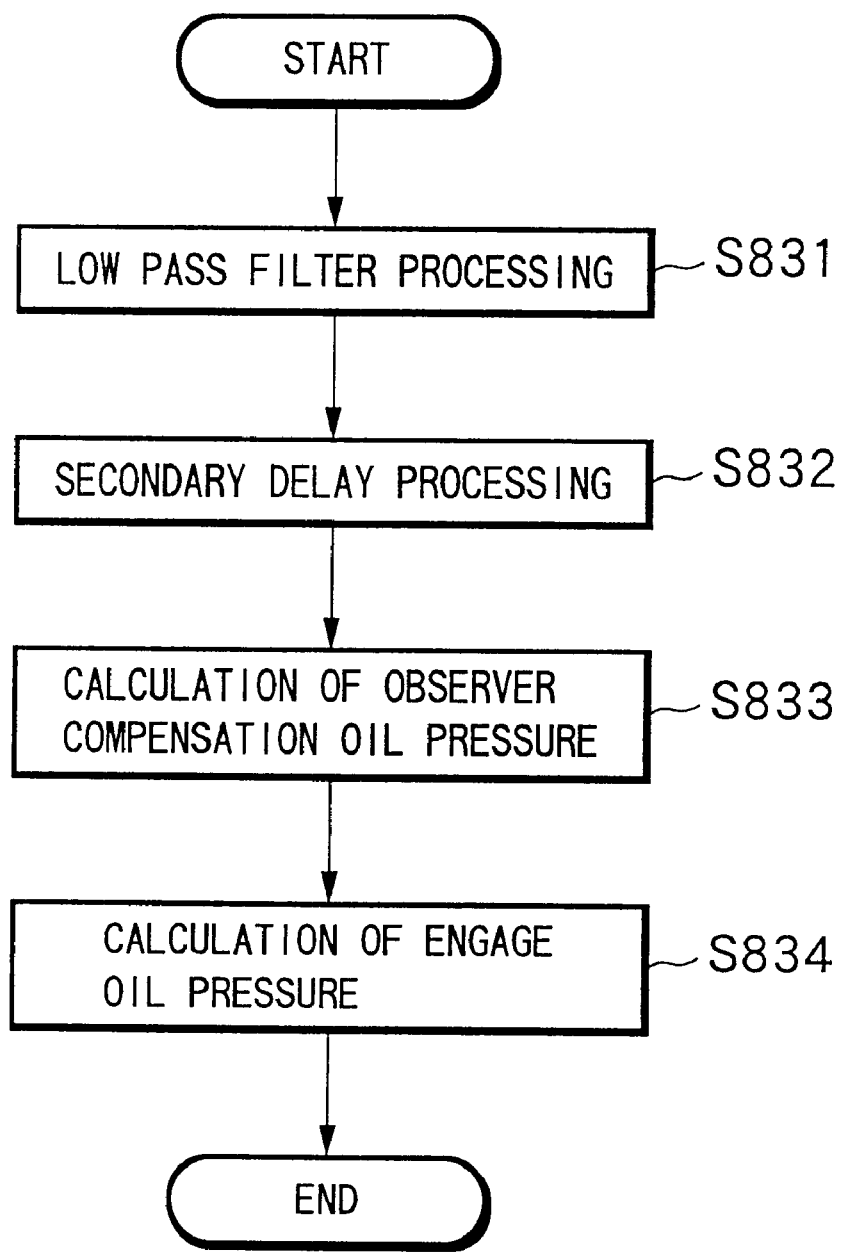
FIG. 30 is a flowchart showing a disturbance observer control in the inertia phase process of the engage side friction engagement element.
Figure 31:
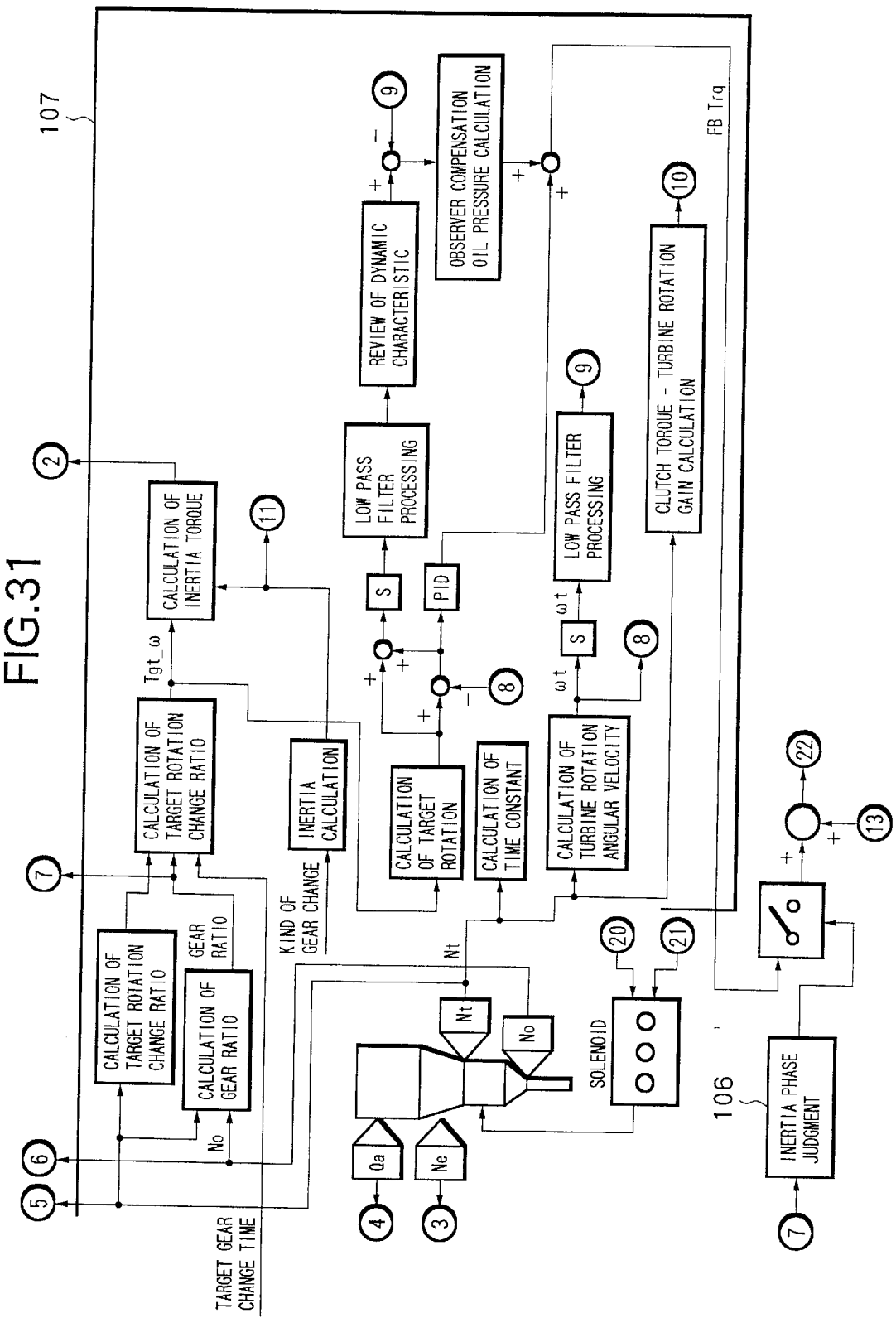
FIG. 31 is a control block diagram showing a block carrying out the rotation feedback control and the disturbance observer control in the inertia phase process of the engage side friction engagement element.

Details of the disturbance observer control will be explained according to a flowchart in FIG. 30 in reference to a block diagram in FIG. 31.

At Step S 831, the deviation between the target turbine rotation speed and the actual target turbine rotation speed is added to the target turbine rotation speed, and the addition result is differentiated and further, the differential value is processed by a low pass filter to cut a high frequency component. Also, the actual turbine rotation speed is differentiated and the differential value is processed by the low pass filter to cut a high frequency component.

It is preferable that a cutoff frequency by the low pass filter is approximately 18 Hz.

At Step S832, a value obtained such that the addition value of the target turbine rotation speed and the deviation (deviation=target turbine rotation speed—actual target turbine rotation speed) is differentiated and processed by the low pass filter, is processed by a second-order lag filter.

The second-order lag filter is a filter with a transmission function=$\omega_n^2/(s^2+2\xi\omega_n s+\omega_n^2)$, and the damping factor $\xi$ and natural frequency $\omega_n$ thereof is altered corresponding to the ATF temperature (oil temperature).

At Step S833, a correction oil pressure Pobs is calculated according to the following equation from a differential value deviation as a deviation between the differential value of [target turbine rotation speed+ a deviation] processed by the low pass filter and the second-order lag filter and the differential value of the actual turbine rotation speed processed by the low pass filter.

$$Pobs = K2 \times \text{inertia } INS \times \text{differential value deviation}$$

The inertia INS (inertia moment) [Nm/rad/sec$^2$] in the above is a value determined based upon the kind of gear change.

At Step S834, an engage side final oil pressure Pc9 is determined by adding the correction oil pressure Pobs to the engage side oil pressure Pc8.

When it is judged that the gear ratio becomes smaller than the F/B finish gear ratio at Step S6 in the flowchart in FIG. 8, the routine goes from Step S6 to Step S8, wherein it is judged whether or not a predetermined time TIMER 7 has elapsed from a point when the gear ratio becomes smaller for the first time than the F/B finish gear ratio.

If it is within the predetermined time TIMER 7, the routine goes to Step S9, wherein a finish phase routine is executed.

Figure 32:
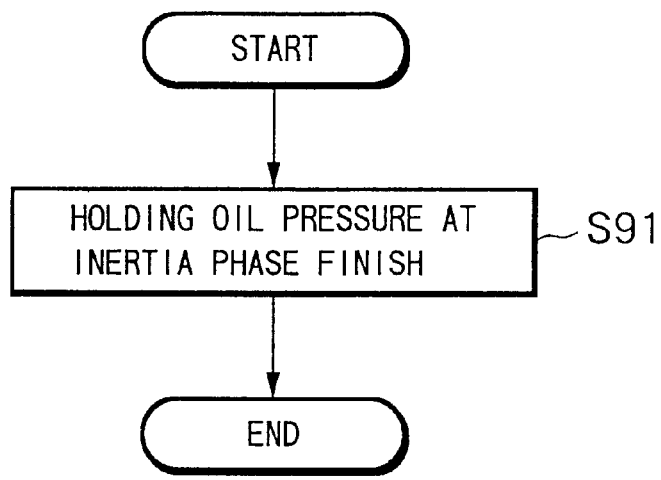
FIG. 32 is a flowchart showing a finish phase process of the release side friction engagement element.

The finish phase routine of the release side friction engagement element is shown in a flowchart in FIG. 32 and at Step S91, oil pressure at an inertia phase finish time is set to be held. Namely, the oil pressure of the release side friction engagement element is to be held as a value at a point when the gear ratio becomes smaller than the F/B start gear ratio at the inertia phase and finish phase.

Figure 33:
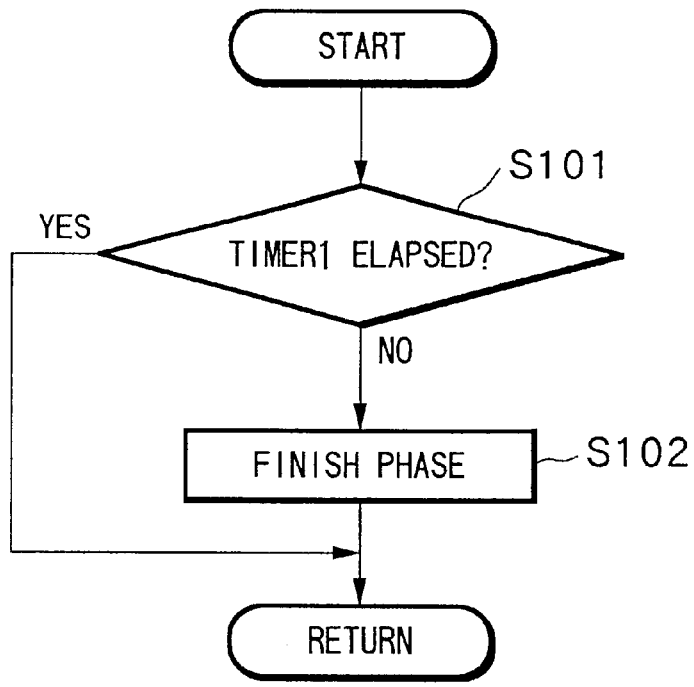
FIG. 33 is a flowchart showing a finish phase process of the engage side friction engagement element.

On the other hand, a finish phase of the engage side friction engagement element is shown in a flowchart in FIG. 33 and at Step S101, it is judged whether or not the predetermined time TIMER 7 has elapsed from a point when the gear ratio becomes smaller for the first time than the feedback finish gear ratio. If it is within the predetermined time TIMER 7, the routine goes to Step S102, wherein the finish phase routine is executed.

Figure 34:
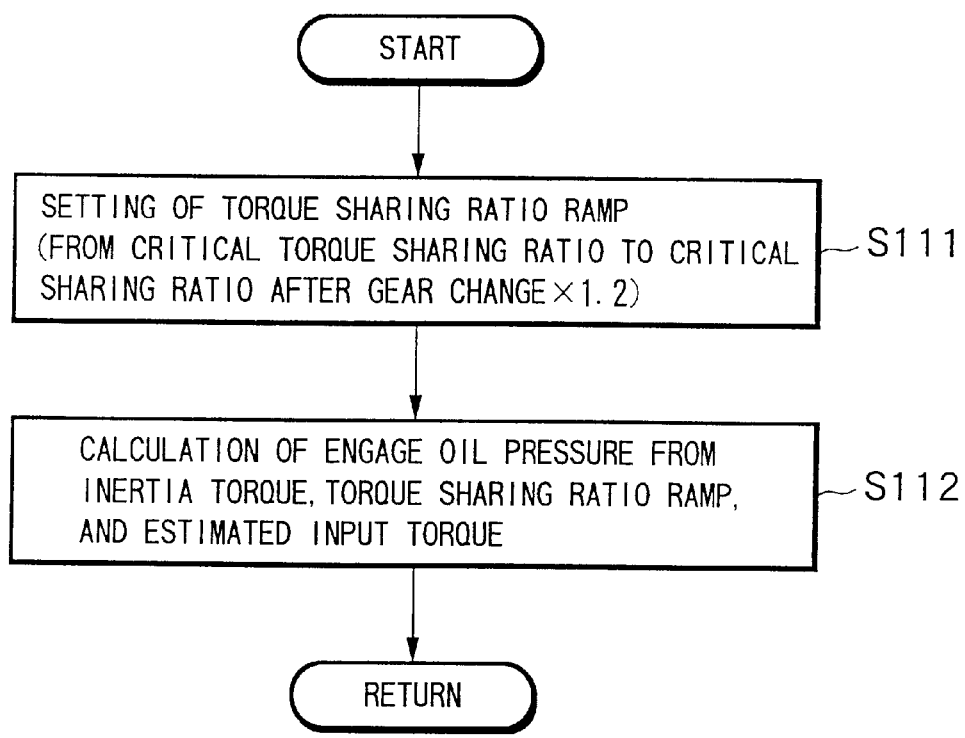
FIG. 34 is a flowchart showing a detail of the finish phase process of the engage side friction engagement element.

Details of the finish phase routine at Step S101 are shown in a flowchart in FIG. 34. At Step S111, a ramp inclination Rmp-Tr2 is set so that an oil pressure is increased from an oil pressure equivalent to the engage critical torque to an oil pressure equivalent to be 1.2 times of the engage critical torque within the predetermined time TIMER 7.

The predetermined time TIMER 7 is set corresponding to the kind of gear change and the kind of friction engagement elements.

At Step S112, an engage side indicated pressure Pc10 is calculated according to the following equation.

$$Pc10 = K2 \times Tt \times Tr\text{-}c \times (1+0.2 \times Rmp\text{-}Tr2) + Prtn\text{-}c + K2 \times Tr\text{-}c \times Tinr$$

The engage side indicated pressure is changed in stepwise from the Pc10 to the maximum pressure at a point when the predetermined time TIMER 7 has elapsed.

The contents of Japanese Patent Application No. 2000-032401 filed on Feb. 9, 2000 are incorporated herein by the reference.

What is claimed:

1. A control apparatus for an automatic transmission for conducting a gear change by making friction engagement element replacement in which an engaging control and a releasing control of two different friction engagement elements are conducted, comprising:

a solenoid valve unit for controlling the supply of oil pressure to said friction engagement elements; and a controller for controlling said solenoid valve unit at the time of gear change to increase a transmission torque capacity of an engage side friction engagement element and decrease a transmission torque capacity of a release side friction engagement element, wherein said controller corrects at least one of said transmission torque capacity of the engage side friction engagement element and said transmission torque capacity of the release side friction engagement element at a torque phase based upon a state of the torque phase.

2. A control apparatus for an automatic transmission according to claim 1, wherein said controller corrects at least one of the transmission torque capacity of the engage side friction engagement element and the transmission torque capacity of the release side friction engagement element at the torque phase according to a torque phase time as the state of the torque phase.

3. A control apparatus for an automatic transmission according to claim 1, wherein said controller corrects at least one of the transmission torque capacity of the engage side friction engagement element and the transmission torque capacity of the release side friction engagement element at the torque phase according to a change amount of an input shaft rotation speed as the state of the torque phase.

4. A control apparatus for an automatic transmission according to claim 3, wherein said controller corrects at least one of the transmission torque capacity of the engage side friction engagement element and the transmission torque capacity of the release side friction engagement element at the torque phase according to a torque phase time as the state of the torque phase together with the change amount of the input shaft rotation speed.

5. A control apparatus for an automatic transmission according to claim 3, wherein said controller corrects at least one of the transmission torque capacity of the engage side friction engagement element and the transmission torque capacity of the release side friction engagement element at the torque phase according to a peak value of the change amount of the input shaft rotation speed.

6. A control apparatus for an automatic transmission according to claim 3, wherein said controller corrects at least one of the transmission torque capacity of the engage side friction engagement element and the transmission torque capacity of the release side friction engagement element at the torque phase according to an integration value of the change amount of said input shaft rotation speed.

7. A control apparatus for an automatic transmission according to claim 3, wherein said controller calculates the change amount of said input shaft rotation speed as a deviation between a reference input shaft rotation speed calculated by a gear ratio before gear changing and an output shaft rotation speed of said automatic transmission, and said input shaft rotation speed.

8. A control apparatus for an automatic transmission according to claim 1, wherein said controller determines the transmission torque capacities of said friction engagement elements based upon an input shaft torque, a critical torque ratio, and a tolerance range of a speed change mechanism, determines the transmission torque capacity of each of said friction engagement element at the torque phase by changing said tolerance range with time elapse, and corrects the transmission torque capacity by altering a change characteristic of said tolerance range.

9. A control apparatus for an automatic transmission according to claim 8, wherein said controller corrects said transmission torque capacity by offsetting said tolerance range.

10. A control apparatus for an automatic transmission according to claim 8, wherein said controller alters only the tolerance range of the engage side friction engagement element based upon a state of the torque phase.

11. A control method for an automatic transmission for conducting a gear change by making friction engagement element replacement in which an engaging control and a releasing control of two different friction engagement elements are conducted, comprising the steps of:

detecting a state of a torque phase during gear changing; and correcting at least one of a transmission torque capacity of an engage side friction engagement element and a transmission torque capacity of a release side friction engagement element at a torque phase based upon said state of the torque phase.

12. A control method for an automatic transmission according to claim 11, wherein said torque phase state detecting step detects a torque phase time.

13. A control method for an automatic transmission according to claim 11, wherein said torque phase state detecting step detects a change amount of an input shaft rotation speed of said automatic transmission at the torque phase.

14. A control method for an automatic transmission according to claim 13, wherein said torque phase state detecting step detects a torque phase time together with the change amount of the input shaft rotation speed at the torque phase.

15. A control method for an automatic transmission according to claim 13, wherein said transmission torque capacity correcting step corrects at least one of the transmission torque capacity of the engage side friction engagement element and the transmission torque capacity of the release side friction engagement element at the torque phase based upon a peak value of the change amount of said input shaft rotation speed.

16. A control method for an automatic transmission according to claim 13, wherein said transmission torque capacity correcting step corrects at least one of the transmission torque capacity of the engage side friction engagement element and the transmission torque capacity of the release side friction engagement element at the torque phase according to an integration value of the change amount of said input shaft rotation speed.

17. A control apparatus for an automatic transmission according to claim 13, wherein said torque phase state detecting step calculates the change amount of said input shaft rotation speed as a deviation between a reference input shaft rotation speed calculated by a gear ratio before gear changing and an output shaft rotation speed of said automatic transmission, and said input shaft rotation speed.

18. A control method for an automatic transmission according to claim 11, further comprising the step of;

determining the transmission torque capacities of said friction engagement elements based upon an input shaft torque, a critical torque ratio, and a tolerance range changing with time elapse of a speed change mechanism, wherein said transmission torque capacity correcting step alters a change characteristic of said tolerance range.

19. A control method for an automatic transmission according to claim 18, wherein said transmission torque capacity correcting step corrects said transmission torque capacity by offsetting said tolerance range.

20. A control method for an automatic transmission according to claim 18, wherein said transmission torque capacity correcting step corrects only the tolerance range of the engage side friction engagement element based upon a state of the torque phase.

* * * * *